US010922711B2

(12) United States Patent
Panigrahi

(10) Patent No.: US 10,922,711 B2
(45) Date of Patent: Feb. 16, 2021

(54) FACIAL RECOGNITION SYSTEM FOR RESTAURANT CUSTOMER RELATIONSHIP MANAGEMENT

(71) Applicant: TOAST, INC., Boston, MA (US)

(72) Inventor: Toshit Panigrahi, Nashua, NH (US)

(73) Assignee: Toast, Inc., Boston, MA (US)

( * ) Notice: Subject to any disclaimer, the term of this patent is extended or adjusted under 35 U.S.C. 154(b) by 106 days.

(21) Appl. No.: 16/169,954

(22) Filed: Oct. 24, 2018

(65) Prior Publication Data
US 2019/0122250 A1 Apr. 25, 2019

Related U.S. Application Data

(60) Provisional application No. 62/577,091, filed on Oct. 25, 2017.

(51) Int. Cl.
*G06Q 30/02* (2012.01)
*G06Q 30/00* (2012.01)
(Continued)

(52) U.S. Cl.
CPC ....... *G06Q 30/0233* (2013.01); *G06F 16/436* (2019.01); *G06F 16/784* (2019.01); *G06F 16/9035* (2019.01); *G06K 9/00288* (2013.01); *G06K 9/00295* (2013.01); *G06Q 20/325* (2013.01); *G06Q 20/4016* (2013.01); *G06Q 30/016* (2013.01); *G06Q 30/0225* (2013.01); *G06Q 30/0238* (2013.01); *G06Q 50/12* (2013.01); *H04N 1/00132* (2013.01); *H04N 1/00336* (2013.01); *H04N 1/32101* (2013.01)

(58) Field of Classification Search
None
See application file for complete search history.

(56) References Cited

U.S. PATENT DOCUMENTS 9,576,287 B1 2/2017 Kalinichenko et al.
9,665,858 B1 5/2017 Kumar
(Continued)

OTHER PUBLICATIONS

A Brief Introduction of Biometrics and Fingerprint Payment Technology Dileep Kumar, Yeonseung Ryu 2008 Second International Conference on Future Generation Communication and Networking Symposia Pertinent pp. 2-3 (Year: 2008)*

*Primary Examiner* — Alexandru Cirnu
(74) *Attorney, Agent, or Firm* — Richard K. Huffman; Huffman Patent Group, LLC

(57) ABSTRACT

A facial recognition system for customer relationship management (CRM) is provided. The system includes one or more cameras, point-of-sale (POS) terminals, and a backend server. The one or more cameras are disposed within a retail establishment, and are configured to capture one or more images of a patron within the establishment. The point-of-sale (POS) terminals are operably coupled to the one or more cameras, where one or more of the POS terminals receives the one or more images, and transmits a request over a network for recognition of the patron. The backend server is disposed other than where the POS terminals are disposed, and is operably coupled to the POS terminals via the network, and is configured to receive the request, to recognize the patron, to access loyalty program data corresponding to the patron, and to transmit the loyalty program data to the POS terminals.

20 Claims, 13 Drawing Sheets

FACIAL RECOGNITION SYSTEM FOR RESTAURANT CRM

(51) Int. Cl.
    *G06K 9/00*     (2006.01)
    *G06F 16/435*     (2019.01)
    *G06F 16/9035*     (2019.01)
    *G06F 16/783*     (2019.01)
    *H04N 1/00*     (2006.01)
    *H04N 1/32*     (2006.01)
    *G06Q 20/32*     (2012.01)
    *G06Q 20/40*     (2012.01)
    *G06Q 50/12*     (2012.01)

(56) References Cited

U.S. PATENT DOCUMENTS

| | | |
|---|---|---|
| 9,721,314 B2 | 8/2017 | Rose |
| 9,741,050 B2 | 8/2017 | Stepanovich |
| 9,875,469 B1 | 1/2018 | Chin et al. |
| 2010/0084462 A1 | 4/2010 | Scipioni et al. |
| 2012/0287281 A1* | 11/2012 | Williams .............. G06Q 30/02 348/148 |
| 2013/0027561 A1 | 1/2013 | Lee et al. |
| 2013/0070974 A1 | 3/2013 | Stefani |
| 2013/0132274 A1 | 5/2013 | Henderson et al. |
| 2014/0012689 A1 | 1/2014 | Henderson et al. |
| 2014/0052613 A1 | 2/2014 | Tavakoli et al. |
| 2014/0105466 A1 | 4/2014 | Botes et al. |
| 2014/0222596 A1* | 8/2014 | S .......................... G06Q 20/206 705/18 |
| 2015/0227978 A1 | 8/2015 | Woycik et al. |
| 2015/0228001 A1 | 8/2015 | Woycik et al. |
| 2015/0278830 A1 | 10/2015 | Zamer et al. |
| 2015/0302388 A1 | 10/2015 | Seidman et al. |
| 2017/0032385 A1 | 2/2017 | Thomas |
| 2017/0372129 A1 | 12/2017 | Lu et al. |

* cited by examiner

FACIAL RECOGNITION SYSTEM FOR RESTAURANT CRM

FACIAL RECOGNITION SYSTEM FOR RESTAURANT CUSTOMER RELATIONSHIP MANAGEMENT

CROSS-REFERENCE TO RELATED APPLICATIONS

This application claims the benefit of the following U.S. Provisional Applications, each of which is herein incorporated by reference in its entirety.

| SER. NO. | FILING DATE | TITLE |
|---|---|---|
| 62/577,091 (TST.0102) | Oct. 25, 2017 | GUEST FACIAL RECOGNITION APPARATUS AND METHOD FOR POINT OF SALE TERMINAL |

This application is related to the following co-pending U.S. Patent Applications, each of which has a common assignee and common inventors.

| SER. NO. | FILING DATE | TITLE |
|---|---|---|
| (TST.0119) | — | MULTI-RESTAURANT FACIAL RECOGNITION SYSTEM |
| (TST.0120) | — | RESTAURANT FRAUD DETECTION APPARATUS AND METHOD |

BACKGROUND OF THE INVENTION

Field of the Invention

This invention relates in general to the field restaurant management, and more particularly to a facial recognition system for restaurant customer relationship management (CRM).

Description of the Related Art

Almost gone are the days when a patron could walk into a retail establishment and be recognized by the proprietor. Many would wax nostalgic of those days when a recognized—and frequent—patron was treated quite a bit better than the average man on the street. As such, the frequent patron was offered better service, discounts, higher quality goods and services, and even greater portions of the goods and services. Such a loyalty system seems now to only exist in local small businesses. To pick out preferred customers today, larger businesses have to train and dedicate human resources, or they have to implement technologies to do the job that has been formerly performed by personnel. Retail industries notoriously operate with low margins, so it follows that engaging and retaining customers is paramount to profitability, as well as to reputation.

To engage and retain customers, retail businesses have resorted to implementing a vast array of loyalty programs, and virtually all of these programs are implemented using automated mechanisms. One would be hard pressed to find an average adult these days who is not a member of at least one loyalty program, for patrons now clip and apply coupons online, they register for discounts and specials over the web, their key chains are loaded with plastic cards containing bar codes, and their smartphones and pocketbooks record numerous loyalty program user names and passwords. And their email inboxes are daily bombarded by advertisements, coupons, and announcements of specials. From a patron's perspective, participation in loyalty programs is onerous at best, and often times irritating to the point that discounts and products are left on the table.

Retail proprietors are quite aware of how burdensome it is for a patron to secure the privileges of most customer loyalty programs. For example, as one skilled in the art will appreciate, most self-service mechanisms (e.g., a kiosk in a restaurant or airport) come equipped with support personnel to help patrons obtain their goods. While difficult self-service mechanisms may not drive a patron to forego a planned airline trip, he/she just might move on to the next restaurant in the food court.

The present inventor has observed the problems alluded to above with present-day customer engagement and retention systems, and has further noted numerous other limitations and disadvantages in the art.

Accordingly, this field of art needs an apparatus and method that automate recognition of patrons in a retail establishment, where the burden of recognition does not fall on the patrons themselves.

What is also needed are techniques for recognizing patrons, and more specifically preferred patrons, while providing access to those patron's loyalty program data and privileges.

What is additionally needed are mechanisms whereby the entire process of order placement, fulfillment, and payment is streamlined to the extent that patrons are recognized and attended to without being annoyed.

What is furthermore needed is a system that not only recognizes and attends to customers in a single retail establishment, but also recognizes and attends to those customers at any retail location in a multiple-store chain.

What is moreover needed are loyalty program processing and payment techniques that protect customers from fraudulent charges.

SUMMARY OF THE INVENTION

The present invention, among other applications, is directed to solving the above-noted problems and addresses other problems, disadvantages, and limitations of the prior art. The present invention provides a superior technique for improving customer relations in retail establishments and efficiency of order processing and fulfillment through the employment of facial recognition. In one embodiment, a facial recognition system for customer relationship management (CRM) is provided. The system includes one or more cameras, point-of-sale (POS) terminals, and a backend server. The one or more cameras are disposed within a retail establishment, and are configured to capture one or more images of a patron within the establishment. The point-of-sale (POS) terminals are operably coupled to the one or more cameras, where one or more of the POS terminals receives the one or more images, and transmits a request over a network for recognition of the patron. The backend server is disposed other than where the POS terminals are disposed, and is operably coupled to the POS terminals via the network, and is configured to receive the request, to recognize the patron, to access loyalty program data corresponding to the patron, and to transmit the loyalty program data to the POS terminals.

One aspect of the present invention contemplates a facial recognition system for customer relationship management (CRM). The system has one or more cameras, point-of-sale (POS) terminals, and a backend server. The one or more cameras are disposed within a retail establishment and are configured to capture one or more images of a patron within the establishment. The POS terminals are operably coupled to the one or more cameras, where one or more of the POS terminals receives the one or more images, and transmits a request over a network for recognition of the patron. The backend server is disposed other than where the POS terminals are disposed, and is operably coupled to the POS terminals via the network, and is configured to receive the request, to recognize the patron, to access loyalty program data corresponding to the patron, and to transmit the loyalty program data to the POS terminals. The backend server has a payment processor that is configured to access a stored payment method corresponding to the patron, based on recognition of the one or more images as the patron.

Another aspect of the present invention envisages a facial recognition method for customer relationship management (CRM). The method includes: via one or more cameras disposed within a retail establishment, capturing one or more images of a patron within the retail establishment; via one or more of a plurality of point-of-sale (POS) terminals, receiving the one or more images, and transmitting a request over a network for recognition of the patron; and via a backend server, disposed other than where the plurality of POS terminals is disposed, and operably coupled to the plurality of POS terminals via the network, receiving the request, recognizing the patron, accessing loyalty program data corresponding to the patron, and to transmitting the loyalty program data to the plurality of POS terminals.

BRIEF DESCRIPTION OF THE DRAWINGS

These and other objects, features, and advantages of the present invention will become better understood with regard to the following description, and accompanying drawings where.

DETAILED DESCRIPTION

Figure 1:
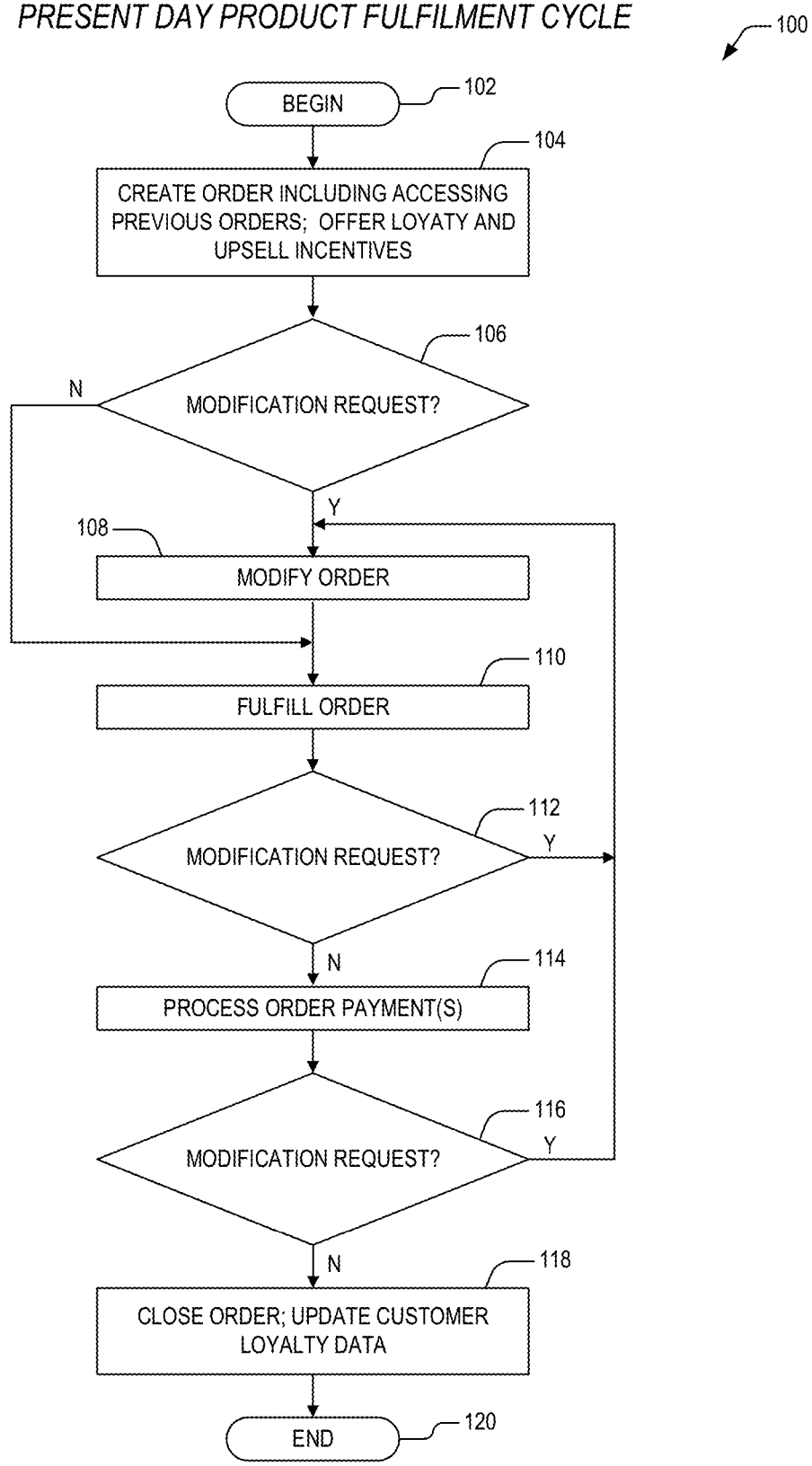
FIG. 1 is a flow diagram illustrating a present-day product fulfillment cycle for placing orders, offering loyalty and upsell incentives, fulfilling orders, processing payment for the orders, and updating customer loyalty data.

Exemplary and illustrative embodiments of the invention are described below. It should be understood at the outset that, although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Central Processing Unit (CPU): The electronic circuits (i.e., "hardware") that execute the instructions of a computer program (also known as a "computer application" or "application") by performing operations on data that include arithmetic operations, logical operations, and input/output operations.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general-purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

In view of the above background discussion on present-day restaurant management systems and associated techniques employed therein for executing customer relationship management (CRM) programs and initiatives, a discussion of these systems and techniques will be presented with reference to FIG. 1. Following this, a discussion of the present invention will be presented with reference to FIGS. 2-13. The present invention provides superior mechanisms and techniques that overcome the disadvantages and limitations of present-day restaurant management systems by employing facial recognition apparatus and methods to improve the timeliness and effectiveness of customer loyalty and incentive programs, payment by patrons, and related CRM functions such as, but not limited to, demographic analytics and fraud detection. In addition to providing efficiency improvements in this field of art, the present invention furthermore provides for significant performance improvements on ordering and payment devices, as well as on point-of-sale (POS) terminals within one or more associated establishments.

Turning to FIG. 1, a flow diagram 100 is presented illustrating a present-day method for fulfilling product orders for one or more patrons. The method is indicative of how the one or more patrons may interact with retail staff within a retail establishment for the purpose of ordering, upselling, modifying, fulfilling, paying for, updating loyalty data, and closing out an order for goods and/or services.

Flow begins at block 102, where one or more patrons enter into the retail establishment desirous of purchasing goods and/or services. The retail establishment may comprise, but is not limited to, a restaurant at a fixed location, a mobile restaurant (e.g., food truck), a retail store (e.g., big box store), a hotel lobby having product kiosks, a sports stadium having product stands, an entertainment venue (e.g., movie theater, concert hall), a cruise ship, an airliner, or any other scenario within which one or more patrons may select, pay for, and enjoy goods and/or services. Flow then proceeds to block 104.

At block 104, the one or more patrons select their goods and/or services and an order is created at a POS terminal. The order may be created by the patrons themselves (e.g., self-ordering on the POS terminal, or "kiosk") or the order may be initiated by a retail staff member on the POS terminal or a mobile order entry device. The order may have identifying information (e.g., an order number) attached thereto. As part of order creation, loyalty information for one or more of the patrons may be accessed by means of data associated with the patrons, which is entered by the patrons or by the retail staff member. Present day techniques to access loyalty data include providing/entering a telephone number, a user name and password, an email address, etc. When provided/entered, the accessed loyalty information may include past orders, order frequency, past visits, gift cards and point programs, special incentive offers, and upsell prompts for use by the retail staff. Flow then proceeds to decision block 106.

At decision block 106, an evaluation is made to determine if the order is to be modified. For example, one of the one or more patrons may make a change to the order (e.g., "cut the pickles," "the green lampshade instead of the blue lampshade," etc.). If so, then flow proceeds to block 108. If the order remains unchanged, then flow proceeds to block 110.

At block 108, the order is modified on the POS terminal according to the requested change. Flow then proceeds to block 110.

At block 110, the POS terminal may transmit the order to an order fulfillment area of the retail establishment. For example, in a big box store, this area may comprise a warehouse area in the back. In a restaurant, this area may comprise a kitchen. Other examples abound. Accordingly, retail staff members in the order fulfillment area begin preparations to fulfill the order. Flow then proceeds to decision block 112.

At decision block 112, an evaluation is made to determine if the order is to be modified, yet again. As one skilled in the art will appreciate, patrons are finicky and inconsistent and, as the saying goes, "the customer is always right." If the order remains unchanged, then the order is fulfilled and flow proceeds to block 114. If the order is to be modified, then flow proceeds to block 108.

At block 114, following fulfillment of the order, one or more payment sources for the order are processed by the POS terminal. The payment sources may include, but are not limited to, cash, check, gift cards, gift tokens, magnetic strip credit cards, Europay, MasterCard, and Visa (EMV) credit cards (i.e. chip-and-signature credit cards, chip-and-PIN credit cards), credit cards employing near-field communications (NFC), credit cards employing radio frequency identification (RFID), loyalty accounts, house accounts, bitcoins, and other types of digital currencies. Flow then proceeds to decision block 114.

At decision block 116, an evaluation is made to determine if the order is to be modified even once more. For example, even after initial payment occurs in block 114, the one or more patrons may decide to modify the paid-for order by ordering additional goods and/or services (e.g. "Can I get a coffee in a to go cup?", "Oh, wrong credit card. Use this one."). Accordingly, if the order is to be modified, flow then proceeds to block 108, where the state of the order is modified to allow for consistency, regardless of whether additional fulfillment is required. If the order is not to be modified, flow proceeds to block 118.

At block 118, the POS terminal may change the state of the order to "closed." Upon closure of the order, loyalty data for the one or more customers may be updated within the restaurant management system. Such loyalty data may include the processed order, amounts paid, and demographics such as time or day, day of the week, etc. Flow then proceeds to block 120.

At block 120, the method completes whereby the one or more patrons may exit the retail establishment, having purchased their goods/and or services, or they may remain for purposes of placing a new order.

The method of FIG. 1 is a general and simple case of what may occur in any present-day retail establishment. Though orders may be taken manually in smaller establishments, more often than not the POS terminal is an electronic data entry and display device in one of several configurations including a fixed POS terminal, a kiosk, or a portable/mobile POS terminal. For establishments and chains that have a significant number of patrons, manual access to their loyalty data is virtually impossible, but electronic access, albeit cumbersome to both customers and retail staff, is possible and such is currently the state of the art.

As alluded to above, there is a need in the art to improve the efficiency of order entry and processing, including the execution of CRM actions such as loyalty programs and incentives, payment processing, and other CRM-related tasks. As one skilled in the art will appreciate, with the advent of order entry kiosks and other automated ordering devices, the responsibility for correct order entry, payment, and other CRM-related tasks is increasingly being transferred from retail staff to the patrons themselves. For purposes of the present application, a kiosk is defined to be a fixed or mobile terminal exhibiting a user interface oriented toward patrons placing orders and/or making payments for orders without the assistance of retail staff. A fixed POS terminal and mobile POS terminal are more complex devices that provide for increased functionality and exhibit a user interface oriented toward retail staff placing orders and/or making payments for orders on behalf of patrons. As one skilled in the art will also appreciate, patrons are not as patient with such order entry devices as staff, and may elect to leave the establishment without placing an order because the kiosks are too difficult to operate. Examples of challenges to patrons are numerous, such as difficulty in finding a menu item, difficulty in modifying an order, requirements to enter user names and passwords in order to access loyalty data, and requirements to manually swipe/dip/tap credit cards. Because of these challenges, certain patrons may simply elect to move on. This is a problem, particularly in those retail establishments with very small profit margins.

Attempts have been made to improve the efficiency of order entry and processing systems. For example, U.S. Patent Publications 2015/0228001 and US2015/0227978, both to Woycik et al (hereinafter, the "Nextep" publications), disclose techniques for identifying a patron in an establishment (e.g., retail store, restaurant, etc.) that require at least two identification mechanisms be employed. The identification mechanisms may comprise a camera, an IR sensor, a radio, and/or a microphone. Accordingly, at least two sets of identification data must be generated. The sets may comprise data indicative of an image of the patron's face, data indicative of an image of at least a portion of the patron's vehicle; data indicative of the patron's voice, and data indicative of a unique identifier of a wireless electronic device that is associated with the patron. The identification mechanisms employ the at least two data sets to generate a probabilistic confidence level that the patron matches a customer who has formerly frequented the establishment, and the confidence level is binned into one of a plurality of predefined confidence level ranges, which are then used to determine several features that are directed towards the patron, such as how a point of sale (POS) system within the establishment may tailor a user interface (UI) which may be presented to the patron (via a kiosk) for purposes such as upsell opportunities.

The present inventor has noted that the identification techniques disclosed in the Nextep publications are exceptionally disadvantageous because more than one set of identification data must be generated and processed to identify a patron to a sufficient level of confidence. This prior art is additionally limiting in that it provides for determining whether a customer matches a past record with some level of confidence, but only when more than one set of identification data is generated and processed.

The present inventor has also observed that present-day identification techniques are lacking in that they are only directed toward accessing historical ordering data for purposes of upsell. Consequently, these present-day techniques cannot be employed for new patrons or for patrons who do not come in contact with a kiosk, such as in a full-service establishment that relies on retail staff for order entry and processing. Additionally, these techniques do not provide for any analytics or reporting features, nor do they provide for voluntary enrollment (e.g., asking a patron if he or she wants their picture taken to enroll in a loyalty program).

The present invention overcomes the above noted disadvantages and limitations, and others by providing apparatus and method for recognizing a patron in a retail establishment, by either secretly or voluntarily storing a picture of the patron's face and derived metadata, along with loyalty and payment information, so that he or she can be tracked and/or re-identified using facial recognition exclusively when in the retail establishment or associated retail establishments in the future. The present invention will now be discussed with reference to FIGS. 2-13.

Figure 2:
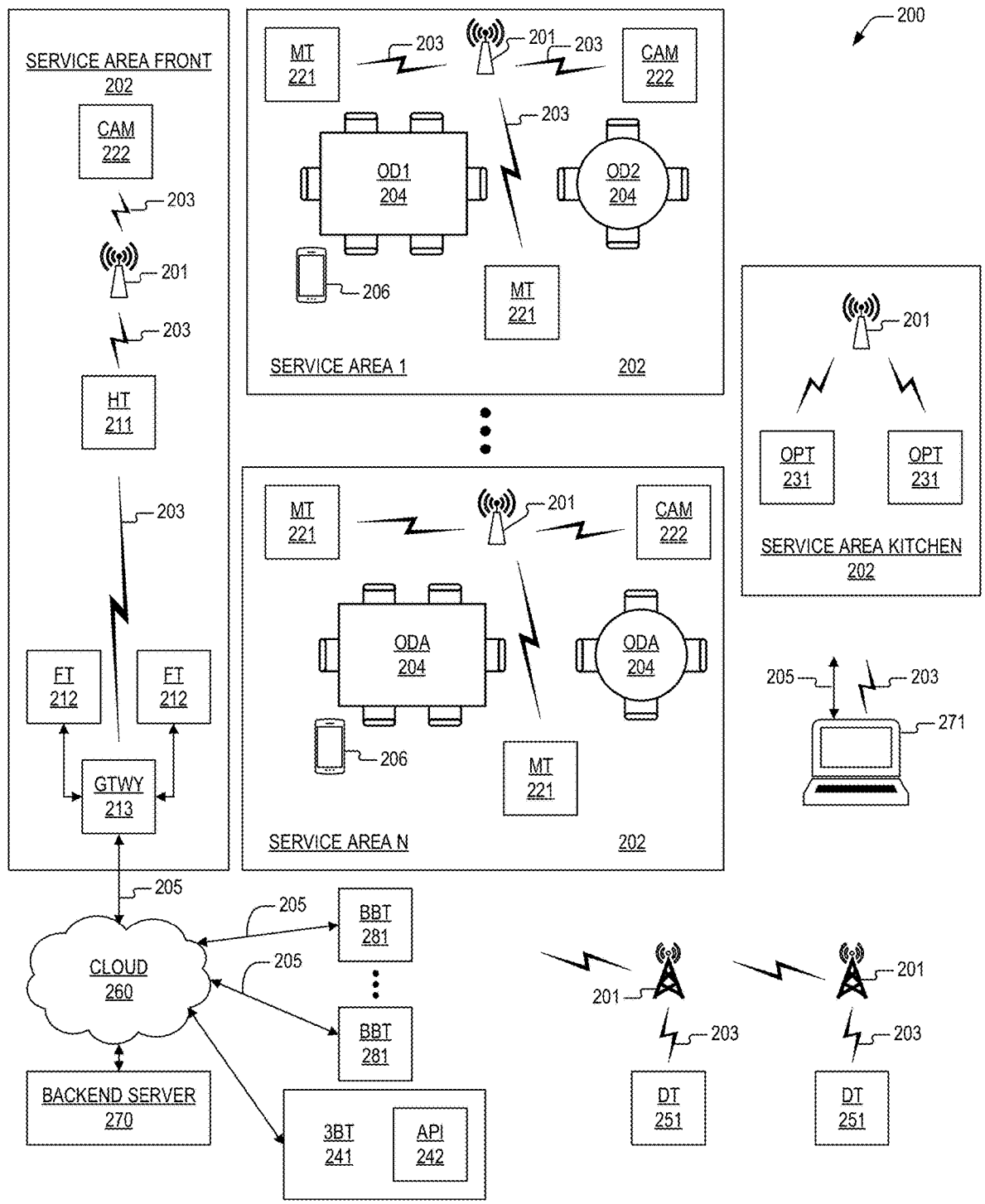
FIG. 2 is a block diagram depicting a facial recognition system for restaurant customer relationship management (CRM) according to the present invention.

Referring now to FIG. 2, a block diagram is presented depicting a facial recognition system 200 for restaurant CRM according to the present invention. The facial recognition system 200 may include one or more service areas 202, such as a front service area 202, service area 1-service area N 202, and a kitchen service area 202. Going forward, the present inventor notes that although the present invention is applicable to any type of retail establishment as described above, a restaurant establishment will be henceforth employed for clarity in order to teach relevant aspects of the present invention. The present inventor further notes that though restaurant terms such as host, wait staff, cook, kitchen, food item, etc. may be employed as well, such terms are used to more clearly teach the present invention in a given context; however, broader and different retail establishment types and associated terms are envisioned.

The service areas 202 may comprise one or more wireless access points 201. The service areas 202 may also comprise one or more wireless POS terminals 211, 221, 231, coupled to the access points 201 via wireless links 203, and which are distinguished in the system 200 as a host terminal 211, mobile terminals 221, and order processing terminals 231. The service areas 202 may additionally comprise one or more facial recognition cameras 222. The cameras 222 may be coupled to the wireless access points 201 over the wireless links 203. The cameras 222 may alternatively be hardwired instead of wireless. The service areas 202 may further comprise a gateway 213 to which are coupled one or more fixed hardwired terminals 212, and which provides for coupling of the fixed terminals 212, access points 201, and hardwired cameras 222 to a backend server 270 over an internet cloud 260 via conventional wired links 205 such as, but not limited to, Ethernet, cable, fiber optic, and digital subscriber line (DSL). As part of a network path to and through the cloud 260 to the backend server 270, providers of internet connectivity (e.g., internet service providers) may employ wireless technologies from tower to tower, etc., but for purposes of this application, such links 205 will be referred to as conventional wired links 205 to distinguish them from local and cellular wireless links. The wireless links 203 may comprise, but are not limited to, Wi-Fi, Bluetooth, near field communications, infrared links, IEEE 802.15.4, Zigbee radio links, and cellular based links (e.g., 3G, 4G, LTE) or a combination of the noted links. The POS terminals 211, 212, 221, 231 may be configured differently to comport with intended function (e.g., host seating, order and payment entry by wait staff, order and payment by patrons (i.e., kiosks), CRM enrollment, order fulfillment, etc.). In one embodiment, the mobile terminals 221 may comprise a tablet computer with a touch screen display and integral payment processor (e.g., card/chip/tap reader) that provides for both order entry, CRM functions, display of order status, and payment processing. As such, the host terminal 211, fixed terminals 212, and order processing terminals 231 may comprise larger tablets with touch screens and integral or coupled payment processors to allow for easier viewing by restaurant staff, or they may comprise displays with keyboard entry and payment processing hardware coupled thereto. In one embodiment, terminals 211, 212, 231 may comprise desktop computers, laptop computers, smartphones, or tablets that are running application programs or web-enabled application programs that provide for communication with the backend server 270 for purposes of order entry, execution of CRM actions, status updates, and optionally, payment processing.

The backend server 270 is coupled to the internet cloud 260 and to an administrative console 271 a conventional wired link 205 and/or a wireless link 203. The backend server 270 is not on-premise and may be herein referred to as a cloud server 270. The administrative console 271 may be disposed within the restaurant premises and coupled to the backend server 270 via the links 203, 205, or the console 271 may be disposed in another location, say, at an operations headquarters for multiple restaurants within a given region. In addition, the system 200 may comprise one or more browser-based terminals 281 that are coupled to the backend server 270 via links 205. In one embodiment, the browser-based terminals 281 may comprise desktop computers, laptop, computers, smartphones, or tablets that are running stand-alone proprietary applications or web-enabled proprietary applications that provide for communication with the backend server 270 for purposes of order entry, CRM programs enrollment, status updates, and optionally, payment processing.

The system 200 may further comprise one or more third-party-based terminals 241 that are coupled to the backend server 270 via the conventional links 205 though the cloud 260. The third party-based terminals 241 may comprise desktop computers, laptop, computers, smartphones, or tablets that are running stand-alone third-party applications or web-enabled third-party applications that provide for communication with the backend server 270 for purposes of order entry, status updates, and optionally, payment processing via a proprietary application programming interface (API) 242. An example of such a terminal 241 may include the well-known GRUBHUB® third-party application that is configured to communicate with the backend server 270 via the API 241.

The system 200 may further comprise one or more delivery terminals 251 that are coupled to one or more cellular access points 201 via conventional cellular wireless links 203, and the cellular access points 201 are coupled to the backend server 270 via the cloud 260. In one embodiment, the delivery terminals 251 are identical to the mobile terminals 221, and are configured to provide services for order entry, CRM enrollment, order fulfillment (i.e., delivery), and payment processing. In another embodiment, the delivery terminals 251 are disposed as smartphones or tablets with a detachable payment processor (e.g., card/chip reader). In a further embodiment, the delivery terminals 251 are disposed as smartphone or tablets with a payment processor integrated within a single housing. Other embodiments are contemplated.

Service areas 202 corresponding to the mobile terminals 221 may have one or more tables 204 corresponding to one or more orders. For clarity, service area 1 202 depicts two tables 204, one of which corresponds to order 1 OD1, and the other of which corresponds to order 2 OD2. The mobile terminals 221 within service area 1 202 may processes portions of both order 1 OD1 and order 2 OD2.

Service area N 202 depicts two tables 204, both of which correspond to order A ODA. The mobile terminals 221 within service area N 202 may both process portions order A ODA.

Though disposed within separate service areas (service area 1 202-service area N 202), the mobile terminals 221 therein may be further configured to process portions of any and all orders within the restaurant and may roam from service area 202 to service area to support work load of the restaurant.

The order processing terminals 231 may process all orders in the restaurant, or they may be configured to each process a portion of all of the orders in the restaurant according to preparation station or inventory station.

The host terminal 211 and fixed terminals 212 may be configured to process all orders in the restaurant to provide for on-premise seating assignment, order initiation, order selection, and payment processing, including closeout of orders.

One or more restaurant staff members (not shown) within service area 1 202-service area N 202 may have a personal device (e.g., smartphone, tablet, laptop) 206 that can provide an ad hoc network (i.e., a hotspot) to which one or more of the mobile terminals 221 may tether for purposes of communicating with the backend server 270 in the absence of Wi-Fi connectivity to the access points 201.

In one embodiment, operations are initiated when the one or more patrons enter the restaurant. Generally, a host (not shown) will create an order (along with corresponding order identifier (O1D) via the host terminal 211 for the one or more patrons, and will seat the patrons at one or more tables 204. Upon entry and along the path to their seats, one or more of the facial recognition cameras 222 will capture one or more facial images of each of the patron. The created order may include service area designation and assignment of the order to one or more mobile terminals 221 along with facial image indicia of each of the patrons. In another embodiment, mobile terminals 221 within a service area 202 are assigned to all orders and facial image indicia within that service area 202. Other embodiments are contemplated. The created order, service area assignment, and data indicative of the facial images are transmitted over the cloud 260 to the backend server 270, which maintains durable terminal queues within which are stored order updates for all orders in the restaurant. In one embodiment, the data indicative of the facial images comprises JPEG images. The JPEG images may be compressed or uncompressed. In another embodiment, the indicative data is provided in a format that comports with an API corresponding to a given $3^{rd}$ party facial recognition service including, but not limited to, AMAZON REKOGNITION®, KAIROS®, and IBM WATSON® VISUAL RECOGNITION.

Each of the plurality of durable queues correspond to each of the POS terminals 211, 212, 221, 231, 251 within the system 200. When connection status to a given terminal 211, 212, 221, 231, 251 is down (i.e., the server 270 cannot verify communication with the given terminal 211, 212, 221, 231, 251), then the server maintains the order updates for that terminal 211, 212, 221, 231, 251 until connectivity is reestablished, at which time the server 270 may transmit one or more of the order updates to the terminal, verifying with each transmission that the terminal 211, 212, 221, 231, 251 received the update. Advantageously, each of the terminals 211, 212, 221, 231, 251 is capable of processing portions of any of the orders in the restaurant.

Likewise, each of the terminals 211, 212, 221, 231, 251 maintains durable order queues within which are stored order updates only for each of the orders being processed by the terminal 211, 212, 221, 231, 251. Each of the terminals 211, 212, 221, 231, 251 also maintains a plurality of order states that depict a current state for each of the orders in the restaurant. As a seated patron selects one or more menu items, wait staff enters the menu items as an update in one of the terminals 211, 212, 221, 231, 251, generally a mobile terminal 221 assigned to the given service area 202. The order update is entered into one of the durable order queues that corresponds to the order ID. If connectivity if present, then the terminal 211, 212, 221, 231, 251 transmits the order update to the server 270 and waits for the server 270 to acknowledge the order update. If acknowledged, the terminal 211, 212, 221, 231, 251 removes the order update from the one of the durable order queues. If unacknowledged (i.e., in the case of non-persistent network connectivity), the terminal 211, 212, 221, 231, 251 maintains the order update in the one of the durable order queues until such time as connectivity is reestablished, and the terminal 211, 212, 221, 231, 251 completes transmission of the order update with acknowledgement by the server 270.

Upon reception of a particular update from the server 270, the terminals 211, 212, 221, 231, 251 may check one of their plurality of order states that correspond to the particular update for conflicts, as will be described in further detail below. If a conflict exists, the terminals 211, 212, 221, 231, 251 may utilize domain specific rules to resolve the conflict in order to establish a valid order state. Each of the terminals 211, 212, 221, 231, 251 is configured with the same domain specific rules to provide for consistent resolution of order states. The order updates may include facial IDs assigned to each of the patrons faces. The order updates may additionally include loyalty data that corresponds to patrons that are recognized. The loyalty data may include patron name, past orders, restaurant and order frequencies, loyalty and incentive program data (e.g., points or number of orders purchased toward a reduced-price order), demographics, and stored payment methods (e.g., gift cards, credit card types, etc.). Preferably, the stored payment methods do not comprise actual credit card numbers, but rather comprise tokens that correspond to payment methods, where the tokens are employed to access actual credit card numbers within secured and encrypted storage.

As patrons continue to order items corresponding to the order ID, the one or more of the terminals 211, 212, 221, 231, 251 may enter the order updates and transmit/durably queue the order updates to the server 270 in accordance with connectivity conditions. The server 270 may also queue/transmit order updates for all orders in the restaurant to each of the terminals 211, 212, 221, 231, 251 according each terminal's connectivity. Order fulfillment, loyalty data access, payment, loyalty data update, and closeout are likewise handled as order updates through the server 270 and are queued/transmitted to all of the terminals 211, 212, 221, 231, 251 in accordance with the connection status of each terminal.

The loyalty data, or lack thereof, may be employed by the system to prompt upsell opportunities via prompts on any of the terminals 211, 212, 221, 231, 251, 281, to process payment, to validate patron identity, to preclude fraudulent payment attempts, to support back-end demographic analytical reports, and any of a number of useful CRM functions.

Patrons outside of the restaurant are also handled in similar fashion via the browser-based terminals 281, and third-party terminals 241, though without feedback from the server 270 regarding all orders in the restaurant. When accessed through the browser-based terminals 281 and third-party terminals 241, the server 270 creates and order ID and assigns it to one of the order processing terminals 231 for fulfillment, while sending status updates on the order ID to all of the terminals 211, 212, 221, 231, 251 via the durable terminal queue therein. Patrons may enroll in a loyalty program by authorizing the terminals 281, 241 to take a facial photo and transmit the photo to the backend server 270. The patrons may further provide payment type and data via the terminals 281, 241, which is encrypted and transmitted to the backend server 240 and provided to secure storage. The server 270 may designate a specific delivery terminal 251 for pickup, delivery, and payment based upon geofenced proximity to the restaurant, or based upon workload corresponding to the delivery terminal. Proximity to the restaurant may be determined by a number of different mechanisms, as will be described in further detail below.

The administrative console 271 may maintain a master record of all order states and order updates according to all of the terminals 211, 212, 221, 231, 251 in order to provide for restaurant management, maintenance, analytics, and network traffic analyses. The console 271 may alternatively be disposed in an expediter's area of the restaurant for use by expediters in assignment and allocation of patron seating and terminals 211, 212, 221, 231, 251.

The durable terminal queues and durable order queues may be disposed as battery backed random-access memory, electrically-erasable programmable read-only memory, solid state memory, hard disk memory, or a combination of the above that will provide for maintaining order updates within the queues across network and power interruptions.

Advantageously, the present invention provides for more efficient performance of computational resources within the server 270 and the POS terminals 211, 212, 221, 231, 251 over that which has heretofore been provided because multiple terminals 211, 212, 221, 231, 251 may be assigned to process portions of a single order, resulting in more timely processing of the single order. Similarly, any of the terminals 211, 212, 221, 231, 251 in the restaurant may be immediately reassigned to a particular order to replace a malfunctioning terminal or to increase throughput of the server 270. Accordingly, computational resources 211, 212, 221, 231, 251, 270 within the system 200 are afforded an overall performance improvement as a result of the present invention.

Figure 3:
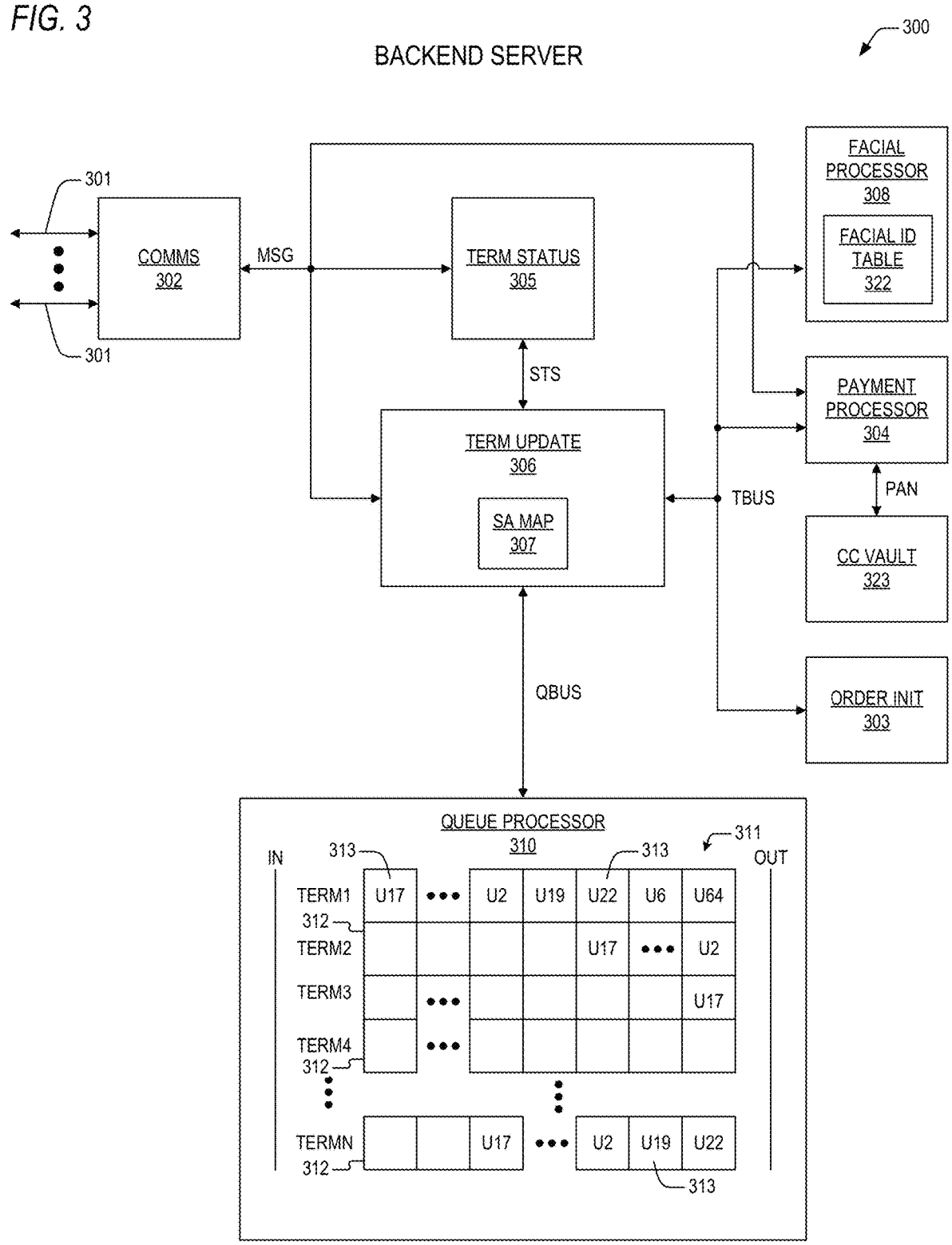
FIG. 3 is a block diagram featuring details of the backend server within the facial recognition system 200 of FIG. 2.

Turning now to FIG. 3, a block diagram is presented featuring the backend server within the facial recognition system 200 of FIG. 2. The backend server 300 may comprise communications circuitry COMMS 302 (e.g., transceivers, modems, message formatter, etc.) that is coupled to one or more wired or wireless communications links 301, examples of which are described above with reference to FIG. 2. The server 300 may also comprise a terminal status element 305, a terminal update element 306, and a payment processor 304, all of which are coupled to COMMS 302 via a message bus MSG. The terminal status element 305 is coupled to the terminal update element 306 via a status bus STS. The terminal update element 306 may comprise a service area map SA MAP 307. The terminal update element 306 is coupled to the payment processor 304, a facial processor 308, and to an order initiation element ORDER INIT 303 via a terminal bus TBUS. The facial processor 308 may comprise a facial ID table 322. The payment processor 304 is coupled to a secure credit card vault 323 via a primary account number bus PAN. Preferably the credit card vault 323 comprises secure and encrypted stores which may be collocated with other elements of the backend server 300, or may be remotely located in a secure facility. The facial processor 308 may be collocated with other elements of the backend server 300, or may be a remotely located web service accessible via the COMMS 302, such as the facial recognition services discussed above with reference to FIG. 2. The terminal update element 306 is also coupled to a queue processor 310 via a queue bus QBUS.

The queue processor 310 may include a durable terminal queue 311 that includes terminal update records 312, each of which are associated with a corresponding POS terminal (not shown) employed within a given restaurant. In the embodiment of FIG. 3, N terminal update records 312 are shown, each associated with a corresponding one of N POS terminals for the given restaurant. In a large restaurant or big box environment, N may be roughly equal to 100 POS terminals, though larger and smaller numbers are contemplated.

Each of the terminal update records 312 may comprise update fields 313, which are employed to queue order updates for transmission to each of the corresponding POS terminals as connectivity to the corresponding POS terminals permits. Update fields 313 nearest to OUT are the oldest order updates queued for transmission to the corresponding POS terminals. Update fields 313 nearest to IN are youngest (or most recent) order updates queued for transmission to the corresponding POS terminals. Fields 313 between the oldest order updates and the youngest order updates descend in age from oldest to youngest update according to when those updates are received from others of the corresponding POS terminals.

Values of the order update fields 313 may include, but are not limited to, an order ID along with order details, loyalty details, and etc. taken by the others of the corresponding POS terminals. Accordingly, the terminal update record 312 for POS terminal 1 TERM1 depicts a plurality of order update fields 313 to be transmitted to TERM1 when connectivity is reestablished with TERM1. In decreasing age from oldest to youngest order update, the fields 313 depict updates to order 64 U64, then order 6 U6, then order 22 U22, and so on, culminating with an update to order 17 U17. As one skilled in the art will appreciate, the terminal update record 312 for TERM1 is indicative that TERM1 has been offline (i.e., no connectivity) longer than any of the other POS terminals in the restaurant. This length of time may correspond to a mobile POS terminal that is serving a party on a restaurant porch that has poor Wi-Fi connectivity, or may correspond to a delivery POS terminal that is traversing an area with poor cellular coverage. The terminal update records 312 corresponding to TERM2, TERM 3, and TERMN depict a number of populated order update fields 313 less than the number of fields for TERM1, which may correspond to mobile POS terminals within the restaurant that have only slightly intermittent Wi-Fi connectivity. And the terminal update record for TERM4 through TERM N–1 contain only empty order update fields 313, thus indicated that these POS terminals are up to date on all order state changes within the restaurant.

Operationally, the terminal status element 305 may periodically transmit a first message to each of the POS terminals and update the connectivity status of the POS terminals based upon whether they acknowledge the first message or not. In one embodiment, the first message may comprise a ping message. In one embodiment, acknowledgment may comprise a simple acknowledge message. In other embodiments, acknowledgement may comprise additional data such as received signal strength indication RSSI, number of hops, or Global Positioning System (GPS) coordinates, as will be described in further detail below.

The terminal status element 305 may provide connectivity status of each of the POS terminals to the terminal update element 306 via bus STS. The service area map 307 is a table that associates each of the POS terminals to one or more service areas within the restaurant. In one embodiment, the terminal update element 306 may generate order update messages from oldest to youngest update for each of the POS terminals that are connected. Connectivity is maintained when a POS terminal acknowledges receipt of an order update message. Once acknowledged, the terminal update element 306 directs the queue processor 310 to delete the oldest order update for that POS terminal and shift pending order updates so that the next oldest order update becomes the oldest order update. In one embodiment, order updates are transmitted to a given POS terminal until its terminal update record 312 is empty, or until connectivity is broken.

In one embodiment, all of the POS terminals associated with the restaurant are updated by the terminal update element 306. In an alternative embodiment, POS terminals are selectively updated in accordance with their mapping to the one or more service areas. For example, the delivery POS terminals may only require knowledge of orders that are to be delivered outside the restaurant, and thus they may be mapped to a "delivery" service area so that order updates that correspond to the delivery service area are transmitted to the delivery POS terminals. Similarly, the restaurant or retail establishment may be so large that management dedicates certain POS terminals to designate service areas. Accordingly, all of the POS terminals in a given service area may be employed to update any order placed within the given service area, but they may not be employed to update orders placed outside of the given service area.

Messages received from the communications circuit 302 may also require additional functions to be performed by the backend server 300. For example, facial images corresponding to a particular order may be provided to the facial processor 308 to determine if a patron is recognized, that is, the patron's image has been previously enrolled in the system and their loyalty data is stored in the facial ID table 322. If unrecognized, the facial processor 308 may assign a unique facial ID to the corresponding image and mark it as unrecognized. If recognized, the facial processor 308 may access the patron's loyalty data within the facial ID table 322 and provide this data in an update field 313 that corresponds to an assigned order ID. The backend server 300 may further receive messages from the communications circuit 302 that include facial images and loyalty program enrollment data, including payment method data, when provided by patrons enrolling from browser based terminal 281, via a fixed terminal within the restaurant 212 (a kiosk or fixed POS terminal), via one of the mobile terminals 221, or via a delivery terminal 251. Accordingly, the facial processor 308 may assign a unique facial ID to each of the facial images and store these images along with enrollment data within the facial ID table 322. The facial ID may be provided to the payment processor 304 in conjunction with payment method data, thus enabling the payment processor 304 to store the payment method data in the credit card vault 323 and to associate the payment method data with the facial ID. Preferably, upon entry of a payment method within the vault 323, the vault 323 will additionally generate a unique token that corresponds to the payment method data only, so that the unique token may be employed to access loyalty program data and other CRM-related data in when patrons decline to provide facial images, but prefer to store a payment method. In such an embodiment, the unique token may be employed throughout the restaurant system to access data in a manner that does not compromise primary account numbers or other sensitive patron data.

When orders are placed by a browser-based or third-party based terminal, the terminal update element 306 may transmit the order update to the order initiation element 303 via TBUS. The order initiation element 303 may then create an order ID for the order update and may assign the order ID to one or more of the POS terminals within the restaurant. Similarly, when an order update message received over the COMMS 302 requires processing of transactions outside of the POS terminals' capabilities (e.g., financial transactions with credit card providers, loyalty card discounts, etc.), the payment processor 304 may generate messages to complete the transactions and the messages are transmitted via COMMS 302. The payment processor 304 may further generate order updates (e.g., "order paid," "payment source 1 approved," "discount amount," etc.) to be transmitted to the POS terminals and may provide these updates to the terminal update element 306 via TBUS. The terminal update element 306 may then provide those updates to the durable queue 311 via QBUS, and the updates are transmitted to the POS terminals in due course dependent upon connection status, as is described above.

The present inventor notes that the term "restaurant" is employed to include those fixed and mobile POS terminals within the restaurant along with corresponding delivery POS terminals associated with the restaurant, such as delivery POS terminals 251 depicted in FIG. 2. There are no terminal update records 312 corresponding to browser-based or third-party-based terminals since orders placed on these devices are created and assigned to one of the POS terminals within the restaurant for fulfillment, preferably order processing terminals, such as the order processing terminals 231 in FIG. 2.

The backend server 300 according to the present invention is configured to perform the functions and operations as discussed above and may comprise one or more central processing units (CPUs) coupled to both transitory and non-transitory stores via conventional mechanisms. The non-transitory stores may include one or more applications programs that may be executed to perform the functions and operations discussed above. The one or more application programs may be cached within the transitory storage for speed of execution at run time. The server 300 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the server 300 may be shared with other circuits, microcode, etc., that are employed to perform other functions and/or operations within the server 300. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Figure 4:
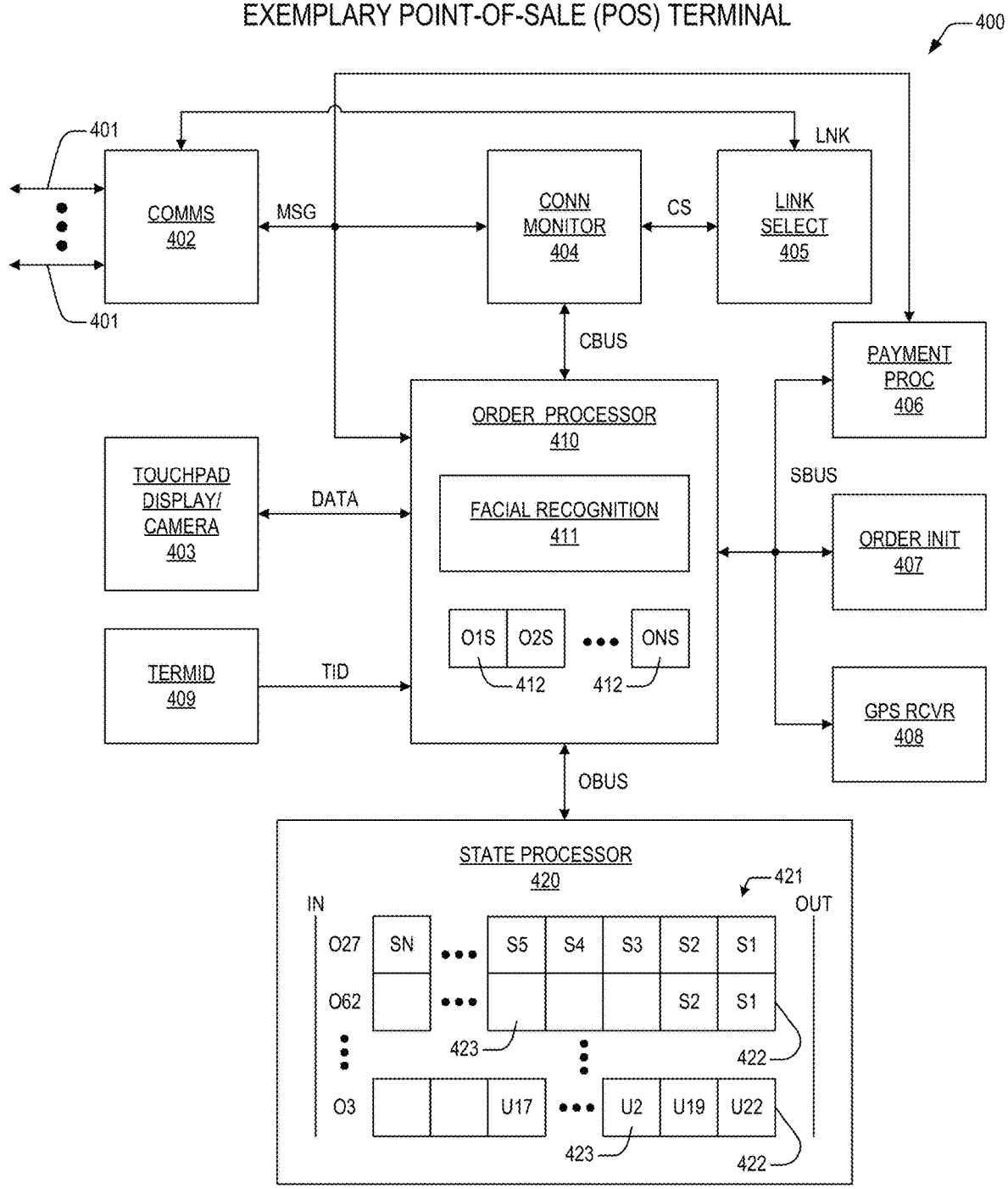
FIG. 4 is a block diagram showing details of a point-of-sale (POS) terminal within the facial recognition system 200 of FIG. 2.

Now referring to FIG. 4, a block diagram is presented showing of a point-of-sale (POS) terminal 400 within the facial recognition system 200 of FIG. 2. The POS terminal 400 is representative of any of the terminals 211-212, 221, 231, 251 discussed with reference to FIG. 2, the differences being primarily in size and complexity of the terminal 400, and whether the terminal 400 may comprise wired or wireless capabilities, or both wired and wireless capabilities.

The durable POS terminal 400 may comprise a communications circuit COMMS 402 (e.g., transceivers, modems, message formatter, etc.) that is coupled to one or more wired or wireless communications links 301, examples of which are described above with reference to FIG. 2. The durable POS terminal 400 may also comprise a connection monitor 404, an order processor 410, and a payment processor 406, all of which are coupled to COMMS 302 via a message bus MSG. The durable POS terminal 400 may also comprise a link select element 405 that is coupled to the connection monitor via bus CS and to the COMMS 402 via bus LNK. The order processor 410 is coupled to the connection monitor 404 via bus CBUS and to the payment processor 406, an order initiation element 407, and a GPS receiver 408 via bus SBUS. The order processor 410 may include a facial recognition processor 411 and is coupled to touchpad display and camera circuits 403 via bus DATA and to terminal ID logic 409 via bus TID. The order processor 410 is also coupled to a state processor 420 via a queue bus QBUS.

The state processor 420 may include a durable order update queue 421 that includes order update records 422, each of which are associated with a corresponding order for the durable POS terminal 400. Individual POS terminals 400 are identified by their corresponding terminal ID, which may be stored within and accessed from the terminal ID element 409.

Each of the order update records 422 may comprise order state fields 423, which are employed to queue order state changes (i.e., order updates) for transmission to a backend server (not shown) as connectivity to the backend server permits. State fields 423 nearest to OUT are the oldest order state changes queued for transmission to the backend server. State fields 423 nearest to IN are youngest (or most recent) order state changes queued for transmission to the backend server. Fields 423 between the oldest state fields 423 and the youngest state fields 423 descend in age from oldest to youngest order state change according to when those state changes are entered by POS terminal 400.

Values of the order state fields 423 may include, but are not limited to, an order ID along with order details and facial images taken by the POS terminal 400. Accordingly, the order update record 422 for order O27 depicts a plurality of order state fields 423 to be transmitted to the server when connectivity is reestablished. In decreasing age from oldest to youngest order state change, the fields 423 depict order state changes S1 through SN. As one skilled in the art will appreciate, the order update record 422 O27 depicts that many more state changes have been entered while connection status of the POS terminal 400 is down than have been entered for orders 62 O62 through order 3 O3. Advantageously, the POS terminal 400 according to the present invention may be employed for entry of order updates even in the presence of network interruptions, which is characteristic of most Wi-Fi networks.

In operation, order state changes result from two sources: the touchpad display/camera circuit 403 and messages received over COMMS 402 from the backend server. In the first case, wait staff in possession of the POS terminal 400 may enter order items as requested by patrons, or in the case of a self-service terminal 400, the patrons may enter the order items themselves. The wait staff may further capture facial images of the patrons or the patrons may operate the touchpad display/camera circuit 403 to capture their own facial image. Accordingly, images captured may be provided via DATA to the facial recognition processor 411 within the order processor 410. The facial recognition processor 411 may generate messages to the backend server over MSG that include one or more captured images corresponding to a specific order number and requesting patron identification, loyalty data, and payment token to be employed for automated payment. The present invention contemplates provisions within the POS terminal 400 to display menu selections and payment options to both wait staff and patrons, with complexity of these options and other functions increased for use by wait staff. For example, a POS terminal 400 functioning as a fixed kiosk may not require the GPS receiver 408 or wireless links 401, but may comprise a touchpad display/camera 403 on the order of 15 inches, an example of which is a 1I-Series 2.0 for Android 15" AiO Touchscreen as produced by Elo Touch Solutions, Inc. A POS terminal 400 functioning as a fixed POS terminal for use by wait staff may be configured similar to the kiosk, but may exhibit a larger touchpad display/camera circuit 403, an example of which is a 1I-Series 2.0 for Android 22" AiO Touchscreen as produced by Elo Touch Solutions, Inc. A POS terminal 400 functioning as a mobile terminal may exclude wired links 401, it may include wireless links 401 and a GPS receiver 408, and it may have a touchpad display/camera 403 configured for handheld use. Order items received from the touchpad display/camera circuit 403 are provided to the order processor 410 via bus DATA, which generates the state changes. State changes received from the server are provided to the order processor 410 in messages over bus MSG.

The connection monitor 404 may monitor reception of a first message (e.g., a ping message) from the backend server and direct transmission of an acknowledgement message. The connection monitor 404 may update the connectivity status of the POS terminal 400 accordingly. In one embodiment, acknowledgment may comprise a simple acknowledge message. In other embodiments, acknowledgement may comprise additional data such as received signal strength indication RSSI associated with one or more access points, number of hops between the backend server and the POS terminal 400, or Global Positioning System (GPS) coordinates, as will be described in further detail below.

The link select element 405 may be employed to direct the COMMS to change links 401 over which to communicate with the server, such as switching from Wi-Fi to LTE, for example. In one embodiment, in the absence of connectivity within the restaurant, the link select element 405 may direct the COMMS 402 to tether to a cellular equipped device corresponding to an order ID, such as devices 206 in FIG. 2, in order to transmit acknowledgements and order state changes to the backend server.

The connection monitor 404 may provide connectivity status of the POS terminal 400 to the order processor 410 via bus CBUS. In one embodiment, the order processor 410 may generate order state change messages from oldest to youngest update for each of the orders in the queue 421. Connectivity is maintained when the POS terminal 400 receives acknowledgement of a previously transmitted order state change message from the server. Once acknowledged, the order processor 410 directs the state processor 420 to delete the oldest state change update for a corresponding order ID and shift pending updates so that the next oldest state change update becomes the oldest order update. In one embodiment, state change updates are transmitted to the server until its order state change record 422 is empty, or until connectivity goes down.

Messages received from the communications circuit 402 may also require additional functions to be performed by the POS terminal. For example, when orders are placed by a browser-based or third-party based terminal, the backend server may transmit the order state change to the POS terminal 400 and the order processor 410 may direct the state processor 420 to create a corresponding order status record 422 in the queue 421. Similarly, when processing of transactions outside of the POS terminal's capabilities (e.g., financial transactions with credit card providers, facial recognition, loyalty card discounts, etc.) are required, order processor 410 may direct the payment processor 406 to generate messages to the server to provide data (e.g., facial ID,s, amounts, payment source type, card swipe/chip information, etc.) to complete the transactions. Such messages are transmitted via COMMS 302. The payment processor 406 may further receive state changes (e.g., "patron not recognized," "patron recognized," "fraudulent payment attempt," "order paid," "payment source 1 approved," "discount amount," etc.) to from the server and may provide these state changes to the order processor 410 via TBUS. The order processor 410 may then provide those updates corresponding current state fields 412.

The POS terminal 400 may further be employed to create an order that includes facial images, as in the case of a delivery terminal, a fixed terminal, a mobile terminal, or a host terminal. Accordingly, from order entry and facial data received over DATA, the order processor 410 may direct the order initiation element 407 to create an order ID and may also direct the state processor 420 to create a corresponding order state record 422 in the queue 421.

The POS terminal 400 terminal according to the present invention is employed to maintain a current state of all orders being fulfilled by the restaurant. The current state of each of the orders are stored in the order current state fields 412 within the order processor 410. The order processor 410 may also comprise domain specific rules, which define actions required to synchronize conflicting order state changes being received and/or processed by the POS terminal 400, where the domain specific rules 411 are unique to all of the POS terminals 400 employed within the restaurant.

For example, suppose that one POS terminal 400 transmits a state change for a specific order to the server, which is acknowledged by the server. Concurrently, a second POS terminal 400 sends a state change for the same order. The server may respond to the second POS terminal with a message indicating that the order current state field 412 for the order ID within the second POS terminal 400 state is out of date (due to connection status) and providing the most recent current state of the order. The domain specific rules are employed by the order processor within the second POS terminal 400 to merge the state changes local to the second POS terminal 400 and may store the merged state in the corresponding current state field 412. The order processor may then direct the COMMS 402 to transmit the corresponding (reconciled) state field 412 contents to the backend server for distribution to all the POS terminals 400.

The key component of correct conflict resolution (i.e. merging of state changes to generate a valid current order state is the domain specific rules. The rules capture dependencies between individual current state field values and validate state transitions. The domain specific rules may include, but are not limited, rules corresponding to pricing, tax, discount, refund, inventory calculations, and loyalty accrual logic.

Advantageously, the present invention provides for improvements in performance of computational resources within the POS terminals 400 over that which has heretofore been provided because the terminal 400 may be employed to process orders in the absence of network connectivity. In addition, unnecessary communications with the server are precluded due to on-board conflict resolution logic. Moreover, computing performance is increased because the terminal 400 may be employed to process any of the other orders within the restaurant because the current states of all restaurant orders are resident therein.

The POS terminal according to the present invention is configured to perform the functions and operations as discussed above and may comprise one or more central processing units (CPUs) coupled to both transitory and non-transitory stores via conventional mechanisms. The non-transitory stores may include one or more applications programs that may be executed to perform the functions and operations discussed above. The one or more application programs may be cached within the transitory storage for speed of execution at run time. The terminal 400 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the terminal 400 may be shared with other circuits, microcode, etc., that are employed to perform other functions and/or operations within the terminal 400. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions and the associated micro instructions are directly execute by a unit or units within the CISC microprocessor.

Figure 5:
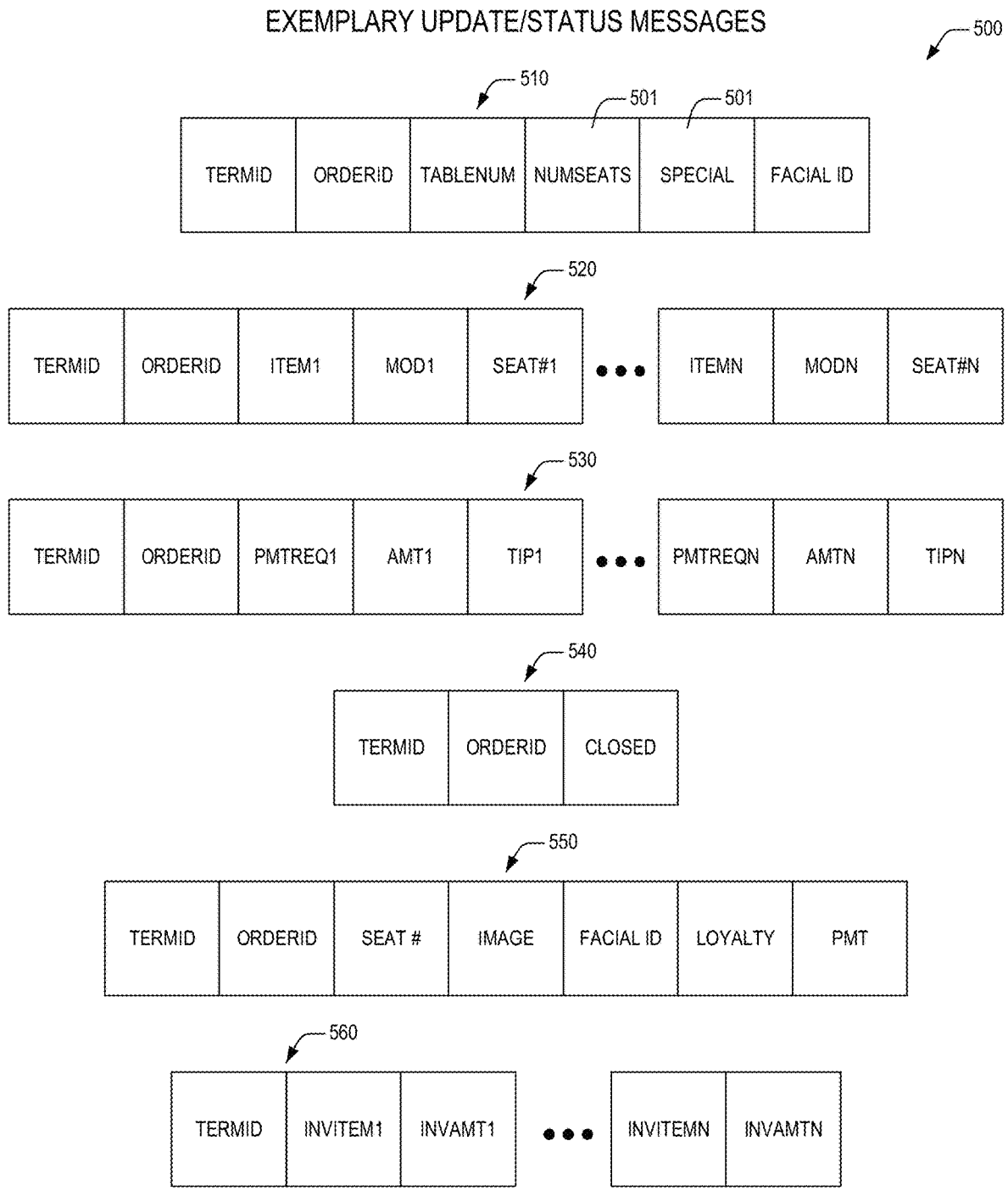
FIG. 5 is a block diagram illustrating exemplary status messages according to the present invention that are exchanged between the backend server and fixed/mobile terminals.

Now turning to FIG. 5, a block diagram 500 is presented illustrating exemplary update/status messages according to the present invention that flow between a backend server and a POS terminal.

An order assignment message 510 transmitted by the server to one or more POS terminals may comprise fields 501 having a specific terminal ID TERMID assigned for a particular order ID ORDERID along with a table number TABLENUM having a given number of seats NUMSEATS. The message 510 may further comprise a SPECIAL field 501 via which special requirements (e.g., high chair, wheel chair access) are communicated to the POS terminal. The message 510 may moreover comprise facial ID fields via which loyalty and/or payment token data is provided to the POS terminals for one or more patrons that have been recognized.

An order state change message 520 transmitted from a POS terminal to the server may comprise TERMID and ORDERID fields 501 as described above, along with one or more groups of ITEM, MOD, and SEAT # fields 501, where contents of the ITEM field 501 indicated a menu item ordered for a given seat number at the table along with any modifications to the item number (e.g., rare, no onions, etc.).

A payment state change message 530 transmitted from a POS terminal to the server may comprise TERMID and ORDERID fields along with one or more groups of PMTREQ, AMT, and TIP fields 501, where contents of the PMTREQ field 501 indicate a payment type (e.g., cash, MasterCard, etc.), and contents of AMT and TIP indicate amount of payment for the particular payment type along with a tip amount.

An order closeout message 540 may comprise TERMID and ORDER ID fields 501 as noted above, along with a CLOSED field 501, the contents of which indicate whether the particular order ID is open or closed.

An enrollment message 550 exchanged between a POS terminal and the server may comprise a TERMID field 501 as noted above along with ORDERID, SEAT #, IMAGE, FACIAL ID, LOYALTY, and PMT fields, where the IMAGE and PMT fields are employed to communicate facial images and payment method corresponding to a particular seat within the restaurant for a patron that is presently enrolling. The FACIAL ID and LOYALTY fields are provided by the server to a POS terminal and provide a generated facial ID for the seat number along with loyalty program data. The POS terminal may employ the facial ID and loyalty program data to modify presentation of items to the patron corresponding to the seat number for purposes of upselling and for other CRM-related functions.

An inventory message 560 may comprise a group of INVITEM and INVAMT fields 501, the contents of which indicate the amount of inventory remaining for a given inventory item as a result of processing current orders in the restaurant. Accordingly, the server may employ the noted amounts to expedite ordering of additional inventory items, or to instruct the POS terminals to remove certain corresponding menu items from their menus that are displayed to wait staff or patrons.

The messages 510, 520, 530, 540, 550, 560 are not exhaustive of those what may be employed according to the present disclosure but are provided herein to teach further aspects and advantages according to the present invention.

Figure 6:
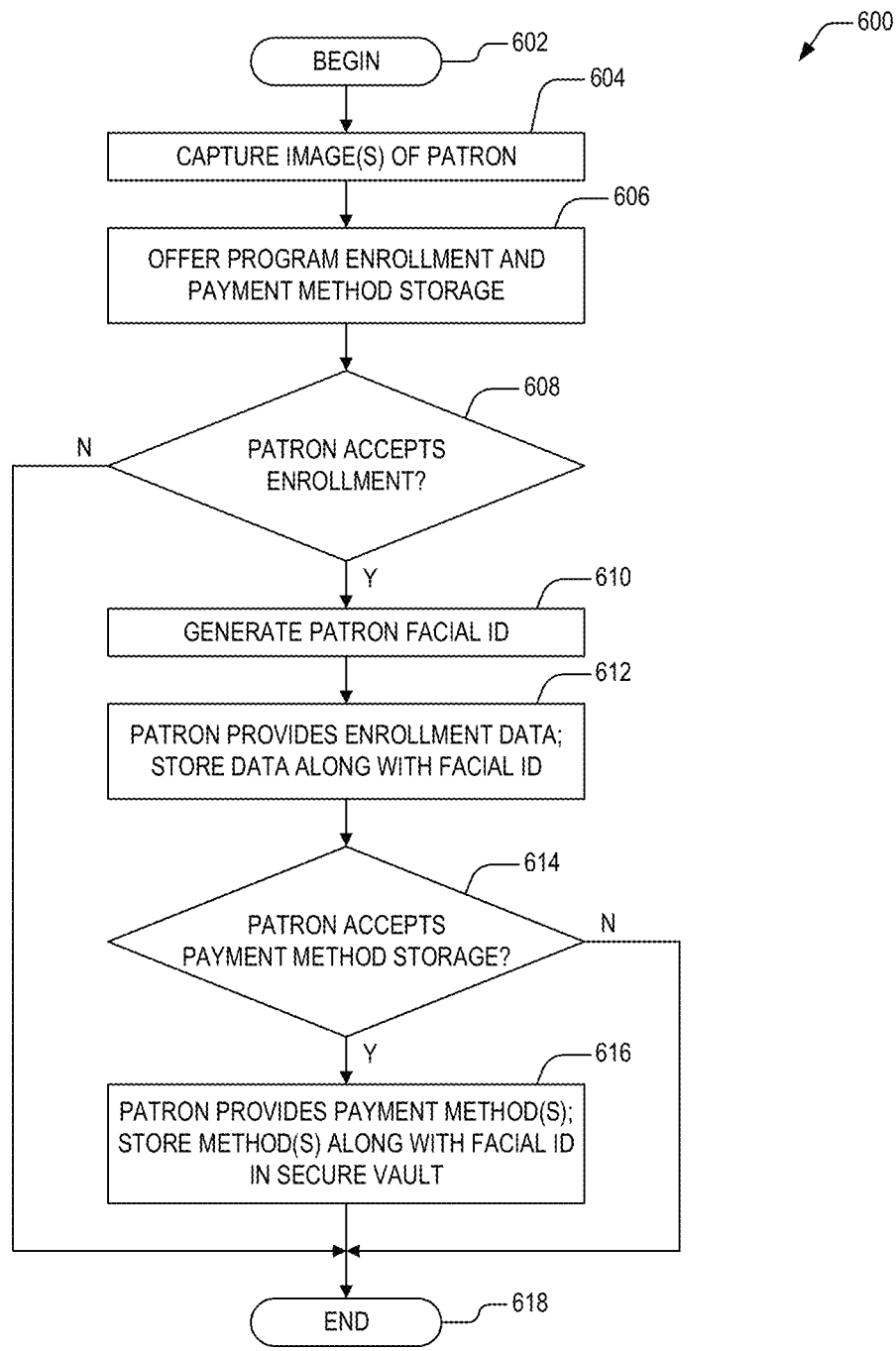
FIG. 6 is a flow diagram detailing a method according to the present invention for enrollment and payment method storage.

Referring now to FIG. 6, a flow diagram 600 is presented detailing a method according to the present invention for enrollment and payment method storage. This method may in part be implemented via portions of the application programs that are disposed within storage in the backend server and terminals of the restaurant facial recognition system described above. Flow begins at block 602 when a patron enters a restaurant according to the present invention. Alternatively, flow begins at block 602 after a patron has entered a restaurant and placed an order. Flow then proceeds to block 604.

At block 604, cameras disposed within the restaurant capture one or more images of the patron. The cameras may be stand alone and coupled to a fixed POS terminal. The cameras may alternatively be integrated into or coupled to a fixed or mobile POS terminal. Flow then proceeds to block 606.

At block 606, via a display a POS terminal, an offer is made to the patron to enroll his/her image into a loyalty program associated with the restaurant or restaurant chain. The offer further includes options to enter a preferred payment method for the patron. Flow then proceeds to decision block 608.

At decision block 608, an evaluation is made to determine whether the patron accepts enrollment of his/her image into the loyalty program. If not, flow proceeds to block 618. If so, flow proceeds to block 610.

At block 610, facial recognition services within the system generate a unique facial ID for association with the one or more facial images, thus providing a mechanism for the system to index and access the images along with loyalty data, demographics, and other CRM-related data. Flow then proceeds to block 612.

At block 612, the patron may enter additional enrollment data such as name, address, phone number, email address, gift cards, other program memberships, and etc. When entered, the additional enrollment data is stored within the system and is associated with the unique facial ID generated at block 610. Flow the proceeds to decision block 614.

At decision block 614, an evaluation is made to determine if the patron additionally opts to provide a preferred payment method. If not, flow proceeds to block 618. If so, flow proceeds to block 616.

At block 616, the patron may enter the preferred payment method, examples of which include credit card type (e.g., VISA, AMEX), credit card number, expiration date, zip code, and other data that may be commonly employed to authorize a credit card charge. Upon entry, this data is encrypted and stored within a secure vault (e.g., storage) within the system along with the facial ID. In addition, another unique token may be stored within the vault to allow for access to loyalty program data in the absence of facial recognition. Flow then proceeds to block 618.

At block 618, the method completes.

The present inventor notes that although the above method is discussed in terms of a patron entering a restaurant and enrolling via one of the POS terminals disposed therein, the present invention also contemplates self-enrollment of the patron via a browser-based terminal or delivery terminal outside of the restaurant premises.

Figure 7:
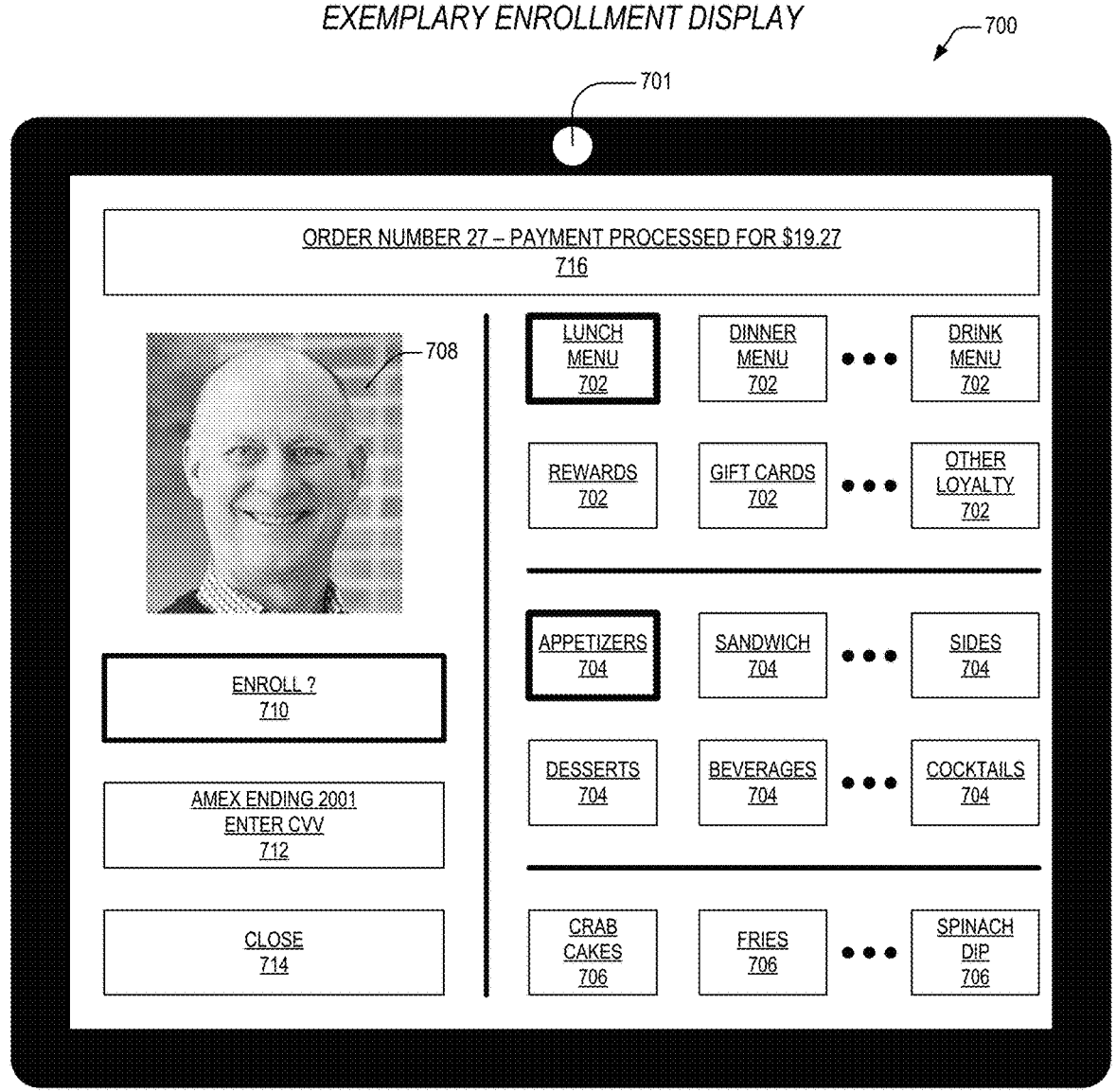
FIG. 7 is diagram illustrating an exemplary enrollment display according to the present invention.

Turning to FIG. 7, a diagram is presented illustrating an exemplary enrollment display 700 according to the present invention. The display 700 is representative of that shown via a touchpad display/camera as part of an in-restaurant POS terminal, a delivery terminal, or a browser-based terminal that has been used to place an order for goods. The display 700 has a plurality of primary icons 702 which, when touched, result in display of a plurality of secondary icons 704. As shown, a highlighted LUNCH MENU icon 702 has been pressed, which results in the display of lunch menu icons 704 that include APPETIZERS, SANDWICH, SIDES, DESSERTS, etc. Pressing one of the secondary icons 704 results in display of a plurality of tertiary icons 706. As also shown, a highlighted APPETIZERS icon 704 has been pressed, which results in the display of appetizer icons 706 that include, CRAB CAKES, FRIES, SPINACH DIP, etc. Via this exemplary hierarchical menu scheme, wait staff (via fixed or mobile terminals), the patron (via a kiosk or browser-based terminal, or delivery staff (via a delivery terminal) may place an order and may provide for payment of the order.

The display 700 also has a payment field 712 that shows a payment method provided by the patron, which has been entered either manually or by convention means (i.e., swipe, dip, tap). The payment field 712, when pressed, allows the patron to enter data to authorize a charge to the payment method, in this case a card verification value (CVV) number. As one skilled in the art will appreciate, different authorization services require alternate or additional information (e.g., zip code of the payment method). The display 700 further has a CLOSE icon 714 which, when pressed will attempt to close out the corresponding order. The display 700 also shows an order status field 716 that details the order number along with order status. If the example shown, the field 716 indicates that a payment of $19.27 has been processed for order number 27.

The display 700 also shows a captured facial image 708 of the patron along with an ENROLL ? icon 710, whereby the patron is offered enrollment of the image 708 into the restaurant's loyalty program along with storage of the processed payment method. By pressing ENROLL, the system stores the captured image, the processed payment method, the order itself, and may further ask the patron to provide identifying information and demographics. Subsequently, and advantageously, the patron may place an order, receive the order, and authorize payment for the order without a requirement to present the preferred payment method.

Figure 8:
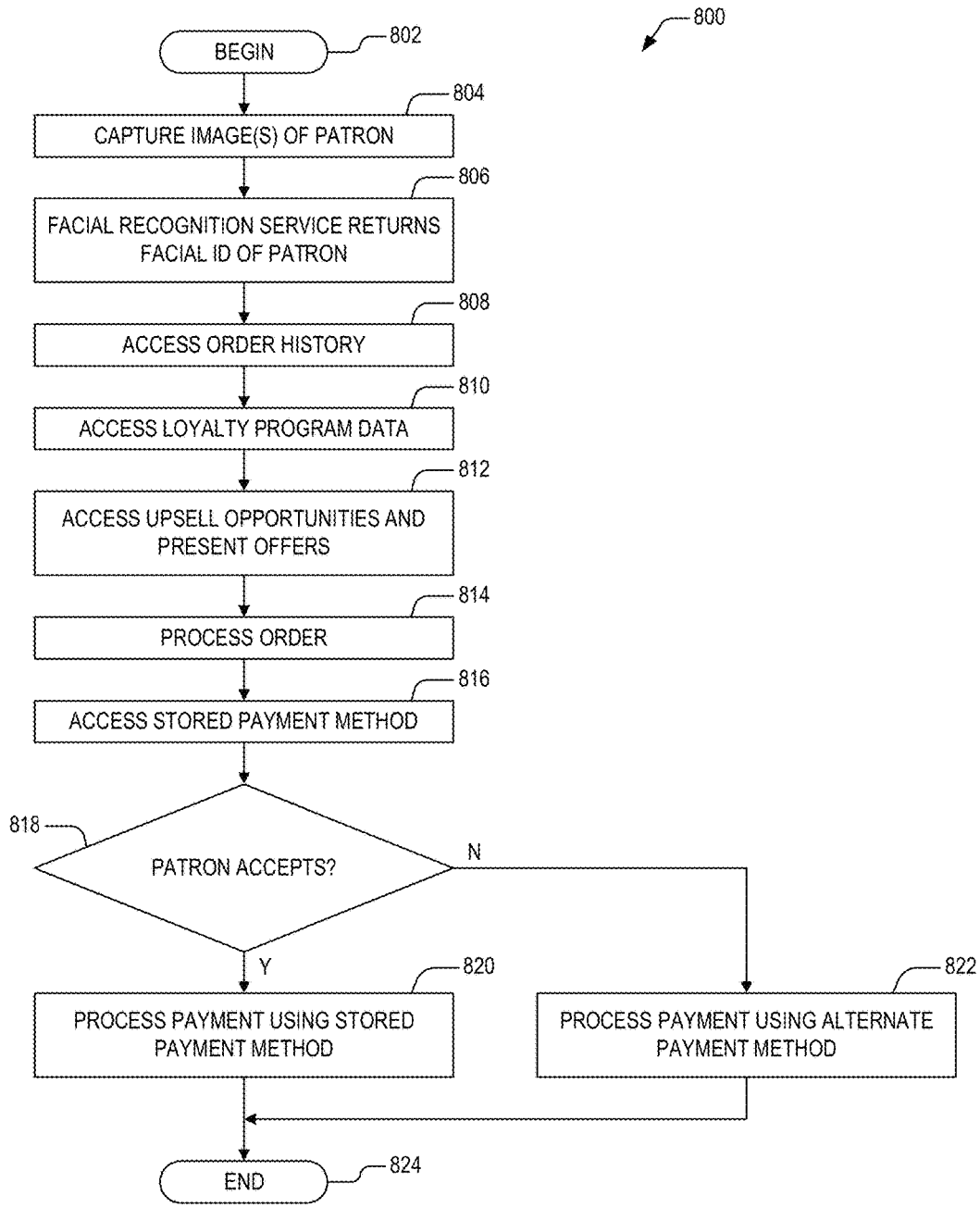
FIG. 8 is a flow diagram depicting a method according to the present invention for CRM and payment that employs facial recognition.

Referring to FIG. 8, a flow diagram 800 is presented depicting a method according to the present invention for CRM and payment that employs facial recognition. This method may in part be implemented via portions of the application programs that are disposed within storage in the backend server and terminals of the restaurant facial recognition system described above. Flow begins at block 802 when a patron enters a restaurant according to the present invention. Flow then proceeds to block 804.

At block 804, cameras disposed within the restaurant capture one or more images of the patron. The cameras may be stand alone and coupled to a fixed POS terminal. The cameras may alternatively be integrated into or coupled to a fixed or mobile POS terminal. Flow then proceeds to block 806.

At block 806, captured images are processed by the facial recognition service and, because the images are recognized, the service returns a unique facial ID for the patron that may be employed to access the patron's loyalty program information and payment method. Flow then proceeds to block 808.

At block 808, the patron's order history is accessed via the facial ID. Flow then proceeds to block 810.

At block 810, the patron's loyalty data is accessed via the facial ID. The loyalty data may include patron name, other identifying data, demographics, loyalty incentives status, and the like. Flow then proceeds to block 812.

At block 812, the order history and loyalty data are employed by the restaurant system to access and present upsell opportunities and offers to the patron. The opportunities and offers may be presented by waits staff using POS terminals or directly to the patron via displays and options on a kiosk. Flow then proceeds to block 814.

At block 814, the patron's order is entered, processed, and fulfilled. Flow then proceeds to block 816.

At block 816, the patron's stored payment method is accessed. Flow then proceeds to decision block 818.

At decision block 818, an evaluation is made to determine whether the patron accepts to use his/her stored payment method to pay for the fulfilled order. If so, then flow proceeds to block 820. If not, then flow proceeds to block 822.

At block 820, payment for the order is processed using the stored payment method. Advantageously, only the patron's captured facial image is required to access loyalty information and to pay for the fulfilled order. Flow then proceeds to block 824.

At block 822, the patron is required to provide an alternative payment method, which is processed to pay for the fulfilled order. Flow then proceeds to block 824.

At block 824, the method completes.

The flow diagram 800 of FIG. 8 represents a series of steps using facial recognition that increases the probability of upselling the patron; however, the present inventor notes that the method may be adapted to increase workflow for a given POS terminal that may be experiencing a backup in service because of a large crowd or for other reasons. In this case, flow begins at block 802 when the patron places an order and flow proceeds directly to block 814 where the order is processed. After processing the order, wait staff may request whether the patron would like to pay for the order by facial recognition. If so, then flow proceeds to block 804 (image capture), then to block 806 (facial ID returned). Blocks 808, 810, and 812 are skipped because the order has already been processed, and flow proceeds directly to block 816. Flow through blocks 816, 818, 820, 822, and 824 proceeds as described above.

Figure 9:
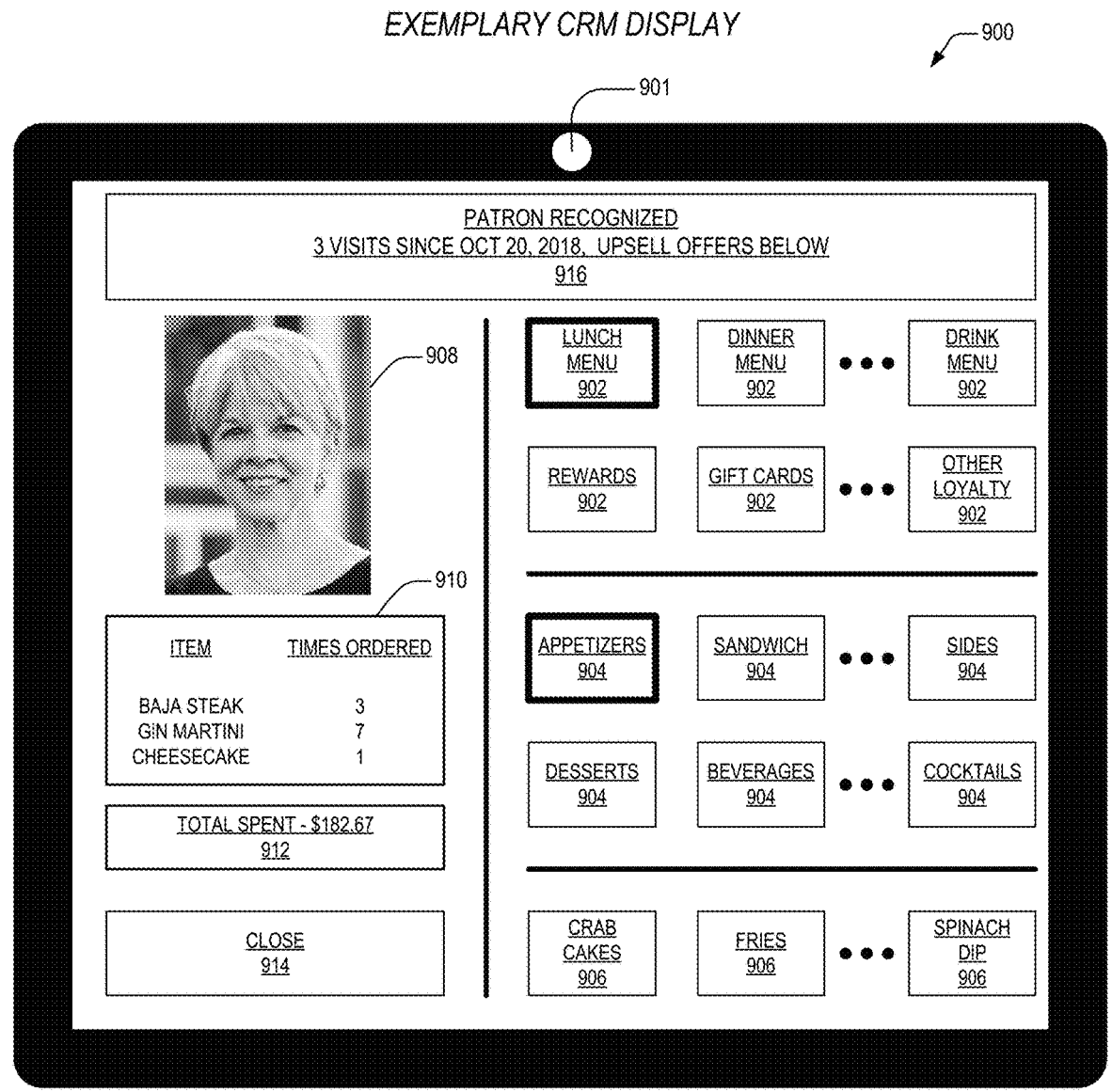
FIG. 9 is diagram featuring an exemplary CRM display according to the present invention.

Turning now to FIG. 9, a diagram is presented featuring an exemplary CRM display 900 according to the present invention. The display 900 is representative of that shown via a touchpad display/camera as part of an in-restaurant POS terminal, a delivery terminal, or a browser-based terminal that may be used to place an order for goods. The display 900 has a plurality of primary icons 902 which, when touched, result in display of a plurality of secondary icons 904. As shown, a highlighted LUNCH MENU icon 902 has been pressed, which results in the display of lunch menu icons 904 that include APPETIZERS, SANDWICH, SIDES, DESSERTS, etc. Pressing one of the secondary icons 904 results in display of a plurality of tertiary icons 906. As also shown, a highlighted APPETIZERS icon 904 has been pressed, which results in the display of appetizer icons 906 that include, CRAB CAKES, FRIES, SPINACH DIP, etc. Via this exemplary hierarchical menu scheme, wait staff (via fixed or mobile terminals), the patron (via a kiosk or browser-based terminal, or delivery staff (via a delivery terminal) may place an order and may provide for payment of the order.

The display 900 also has a captured image field 908 that presents an image of the patron captured by a camera 901 corresponding to the POS terminal or by other cameras within the restaurant. The display 900 further includes an alert field 916 that provides a prompt to wait staff that the patron has been recognized by the system along with number of recent visits and alert of an upsell opportunity.

The display 900 has an offer field 910 that shows loyalty program data corresponding to the recognized patron, in this case an order history showing items and times ordered. Although other types of upsell offers are contemplated, the data in field 910 may be employed by wait staff to prompt the recognized patron to purchase more items or higher margin items. The display 900 also has a TOTAL SPENT icon 912 that provides an indication to wait staff of the purchase volume for the recognized patron. For application to a kiosk, fields 910, 912, and 916 may comprise alternative upsell offers to the patron. The display 900 further has a CLOSE icon 914 which, when pressed will attempt to close out the corresponding order.

Figure 10:
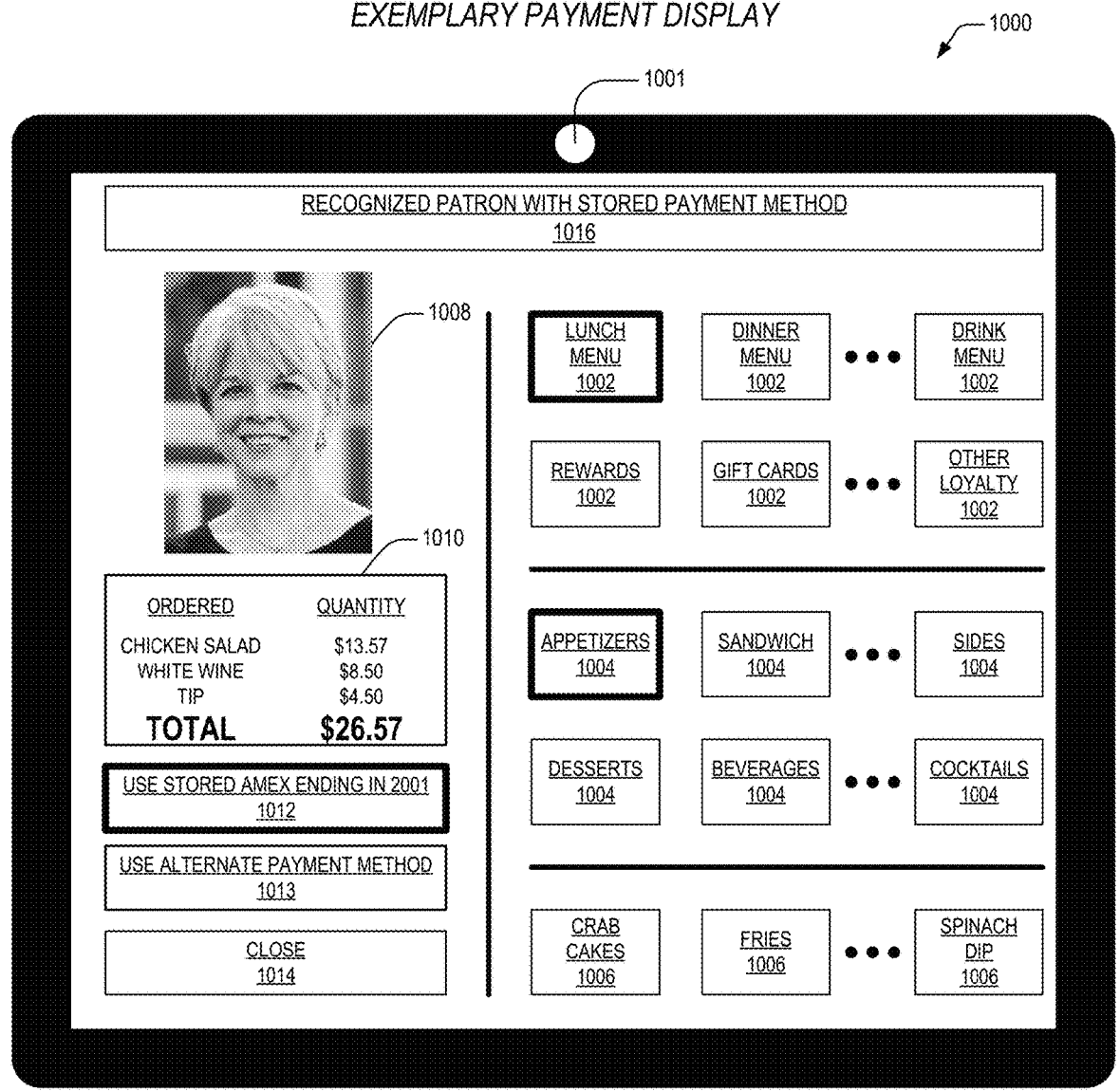
FIG. 10 is diagram showing an exemplary payment display according to the present invention.

Referring now to FIG. 10, a diagram is presented showing an exemplary payment display 1000 according to the present invention. Like the display 900 of FIG. 9, the exemplary payment display 1000 includes primary icons 1002, secondary icons, 1004, tertiary icons 1006, captured image icon 1008, and a close icon 1014, which operate in the same manner as like named icons of the display 900 of FIG. 9.

The payment display 1000 further includes an order summary and total icon 1010 that shows details of the order, a tip by the patron, and a total amount due. The display 1000 also has a patron recognition icon 1016 indicating a match within the system for the captured image 1008. The display 1000 additionally includes a stored payment method icon 1012 and an alternative payment icon 1013. If the patron presses the stored payment method icon 1012, then the patron may be enabled to pay for the order total without having to be in physical possession of the stored payment method. If the patron presses the alternative payment method icon 1013, then the patron is required to provide an alternative physical payment method, namely, cash, a gift card, or another credit card.

Figure 11:
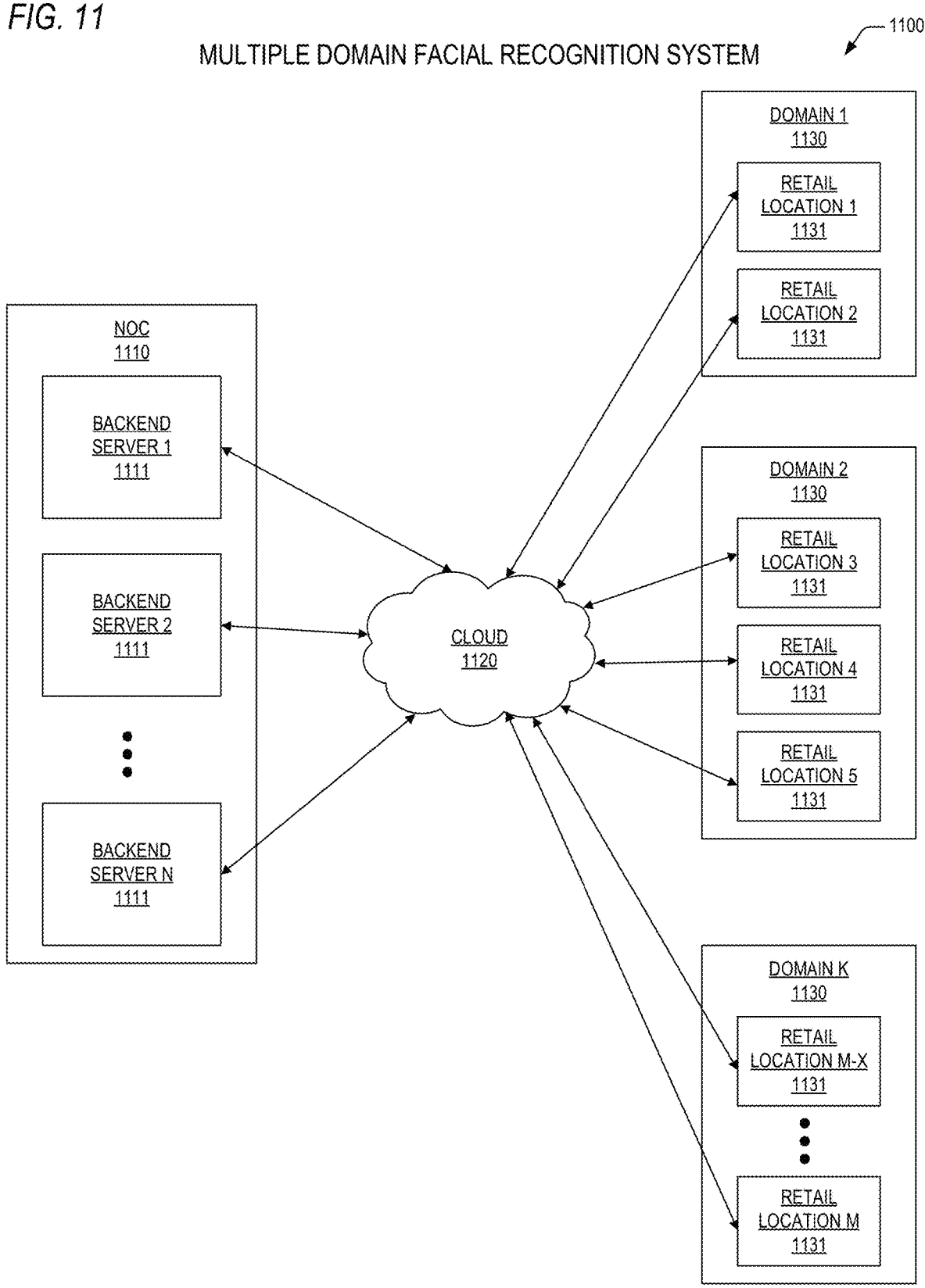
FIG. 11 is a block diagram illustrating a facial recognition system according to the present invention that may be employed across multiple restaurants.

Turning to FIG. 11 is a block diagram illustrating a facial recognition system according to the present invention that may be employed across multiple restaurants. The system 1100 may comprise a network operations center 1110 having a plurality of backend servers 1111 as described above with reference to FIGS. 2-10. The servers 1111 are coupled to the internet cloud 1120 as is described above. The system 1100 may also comprise a plurality of retail locations 1131 that are also coupled to the cloud 1120. Subsets of the retail locations 1131 are divided into domains 1130, where each of the domains 1130 comprise a unique set of domain specific rules as are described above. Each of the retail locations 1131 may be coupled to one or more of the synchronization severs 1111 to allow for synchronization of order updates for POS terminals (not shown) disposed within the retail locations. For example, POS terminals in retail locations 1 and 2 1131 are within domain 1 1130 and may be served by backend server 1 1111. Backend server 1 1111 may utilize the same domain specific rules to synchronize updates between POS terminals in locations 1 and 2 1131, where the server 1111 may update all POS terminals within both locations, or selectively update terminals in location 1 1131 with orders corresponding to location 1 1131, and terminals in location 2 1131 with orders corresponding to location 2. In one embodiment, captured images, corresponding facial IDs, loyalty program information, and stored payment methods are shared between retail locations within a given domain 1130. More specifically, the one or more backend servers 1111 that are assigned to provide services for DOMAIN 2 1130 share captured images, corresponding facial IDs, loyalty program information, and stored payment methods for RETAIL LOCATION 3, RETAIL LOCATION 4, and RETAIL LOCATION 5. Consequently, and advantageously, once a patron is enrolled in the facial recognition system at one of the retail locations 1131 within a given domain 1130, the patron's loyalty program data, demographic data, and stored payment method may be employed within any of the retail locations 1131 in that given domain 1130. In addition to providing substantial order processing efficiency improvements in this field of the art, processing and throughput performance improvements are provided on the POS terminals themselves as a result of the innovations provided for by the present invention.

The use of facial recognition techniques according to the present invention for purposes of loyalty program enrollment, upsell, demographic report development, and payment presents further advantages for both patrons and retail establishment management in the form of payment security, examples of which will now be discussed with reference to FIGS. 12-13.

Figure 12:
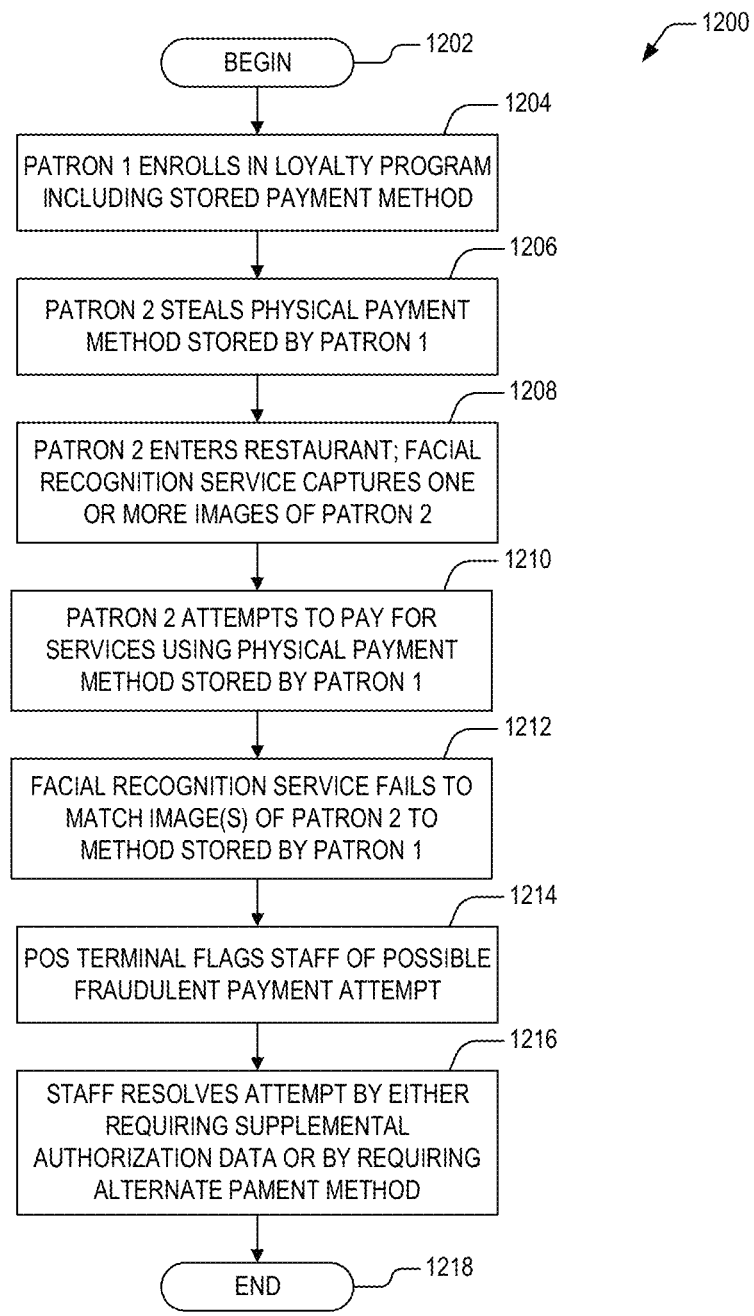
FIG. 12 is a flow diagram detailing a facial recognition fraud detection method according to the present invention.

Referring to FIG. 12, a flow diagram 1200 is presented detailing a facial recognition fraud detection method according to the present invention. This method may in part be implemented via portions of the application programs that are disposed within storage in the backend server and terminals of the restaurant facial recognition system described above. Flow begins at block 1202 when a patron PATRON 1 is presented with the opportunity to enroll in a loyalty and stored payment method program according to the present invention via a POS terminal as disclosed above. Flow then proceeds to block 1204.

At block 1204, PATRON 1 enrolls in the program and his/her preferred payment method is stored along with a captured image, a facial ID, and other identifying information. Flow then proceeds to block 1206.

At block 1206, the physical payment method (e.g., a credit card) that was stored in block 1204 is stolen by PATRON 2. Flow then proceeds to block 1208.

At block 1208, PATRON 2 enters a restaurant that is in the same domain as the POS terminal that was used to enter PATRON 1's preferred payment method in block 1204. The facial recognition system within the restaurant captures one or more images of PATRON 2. Flow then proceeds to block 1210.

At block 1210, following order fulfillment, PATRON 2 attempts to use the stolen physical payment method to pay for his/her order. Flow then proceeds to block 1212.

At block 1212, the facial recognition system within the restaurant fails to recognize PATRON 2 as the authorized user of the payment method corresponding to PATRON 1. Flow then proceeds to block 1214.

At block 1214, the POS terminal corresponding to PATRON 2's order is provided with an alert of a possible fraudulent payment attempt. Flow then proceeds to block 1216.

At block 1216, alerted wait staff may resolve the possible fraudulent payment attempt by requiring PATRON 2 to provide supplemental authorization data (e.g., driver's license) or by requiring PATRON 2 to pay for the order using a different payment method. Flow then proceeds to block 1218.

At block 1218, the method completes.

Figure 13:
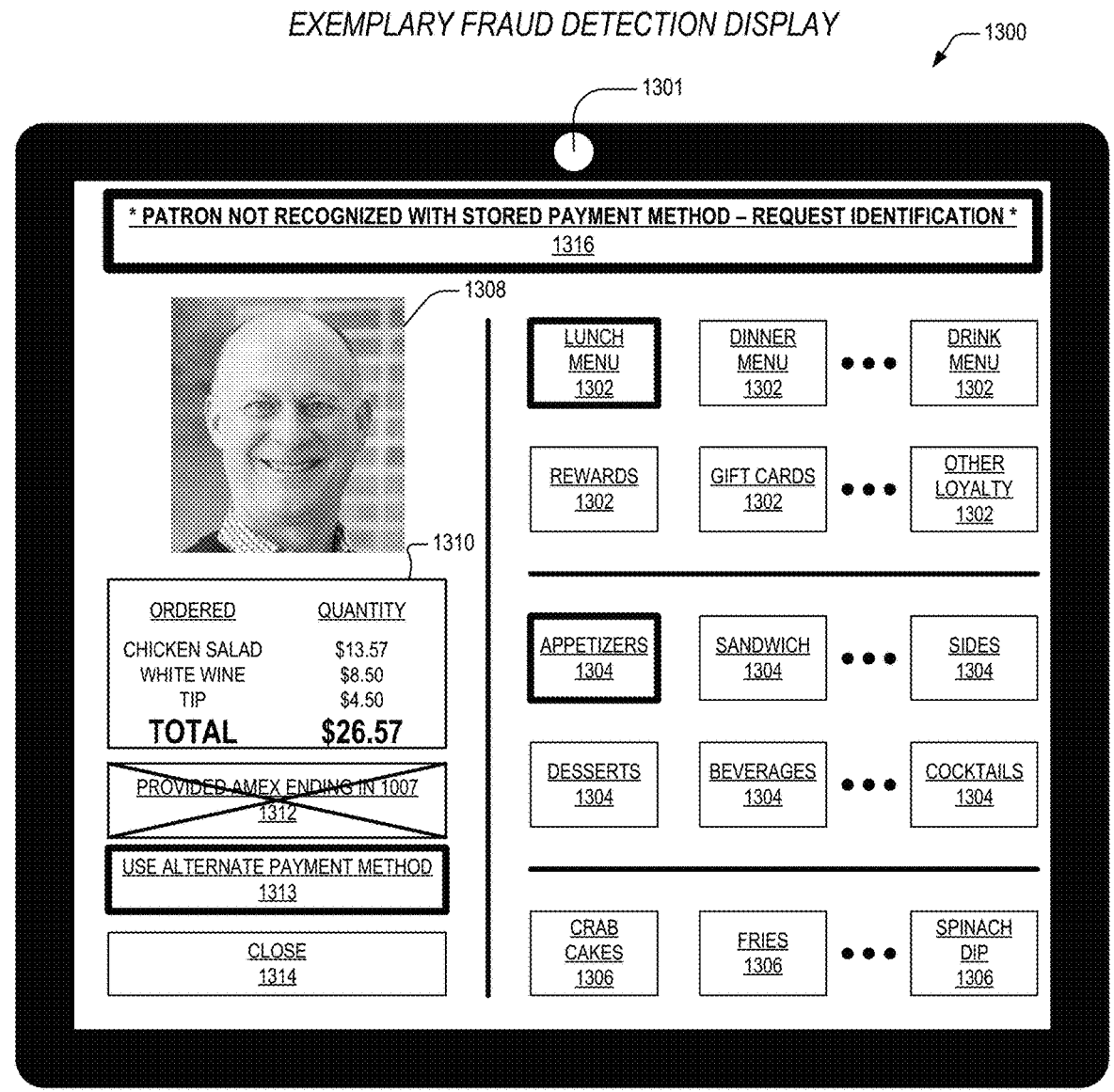
FIG. 13 is a diagram illustrating an exemplary fraud detection display according to the present invention.

Turning finally to FIG. 13 is a diagram illustrating an exemplary fraud detection display 1300 according to the present invention. Like the displays 900, 1000 of FIGS. 9 and 10, the exemplary fraud detection display 1300 includes primary icons 1002, secondary icons, 1004, tertiary icons 1006, captured image icon 1008, and a close icon 1014, which operate in the same manner as like named icons of the displays 900, 1000 of FIGS. 9 and 10.

The fraud detection display 1300 further includes an order summary and total icon 1310 that shows details of the order, a tip by the patron, and a total amount due. The display 1300 also has a patron recognition icon 1316 indicating that the patron in the captured image 1308 is not associated with the payment method provided for payment of the order, and alerting wait staff to resolve the payment issue. The display 1300 additionally includes a provide payment method icon 1312 indicating that the provided payment method does not correspond to the captured image 1308. The display 1300 also includes an alternative payment icon 1313. If the patron presses the alternative payment method icon 1013, then the patron is required to provide an alternative physical payment method, namely, cash, a gift card, or another credit card. In one embodiment, wait staff, when provided with sufficient evidence that the payment attempt is not fraudulent, may override the alert and process payment using the stored payment method. For example, when only one authorized user of a credit card is registered with the system according to the present invention and another authorized user attempts to pay using that credit card, the wait staff may allow the charge on the stored credit card to process and may add the other authorized user to the loyalty system.

Not only can the present invention be employed to detect potential fraud, but it may also be employed to authorize a payment when a credit card authorization service initially declines a charge to a stored payment method. For example, some credit card payment authorization services will automatically decline a charge when an authorized user travels to an entirely new location. In this instance, the facial recognition system according to the present invention may enable an exchange with the credit card authorization service that would allow the charge to process, thereby saving the patron from a potential embarrassing situation.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The storage medium may be non-transitory or transitory. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A facial recognition system for customer relationship management (CRM), the system comprising:
    one or more cameras disposed within a retail establishment, configured to capture one or more images of a patron within said retail establishment;
    point-of-sale (POS) terminals, operably coupled to said one or more cameras, wherein one or more of said POS terminals is configured to receive said one or more images from said one or more cameras, and is configured to receive and enter a physical payment method from said patron, and is configured to transmit over a network said one or more images and said physical payment method as entered along with a request for recognition of said patron as an authorized user of said physical payment method; and
    a backend server, disposed other than where said POS terminals are disposed, operably coupled to said POS terminals via said network, configured to receive said one or more images, said physical payment method as entered, and said request, and configured determine if said patron is recognized as said authorized user of said physical payment method based on said one or more images, and, if a credit card authorization service initially declines a charge corresponding to said physical payment method and said patron is recognized as said authorized user, configured to notify said credit card authorization service that said patron is recognized as said authorized user, and configured to receive authorization from said credit card authorization service that enables said charge to process using said physical payment method.

2. The facial recognition system as recited in claim 1, wherein loyalty program data stored within said backend server comprises an authorized user image that corresponds to said physical payment method.

3. The facial recognition system as recited in claim 2, wherein upsell opportunities are provided to said patron via one or more of said POS terminals based upon said order history.

4. The facial recognition system as recited in claim 1, wherein a first subset of said POS terminals operably connects to said network via one or more Wi-Fi access points disposed within said retail establishment.

5. The facial recognition system as recited in claim 4, wherein said first subset of said POS terminals comprises handheld tablet computers, each comprising one of said one or more cameras.

6. The facial recognition system as recited in claim 4, wherein a second subset of said POS terminals operably connects to said network via a wired connection disposed within said retail establishment.

7. The facial recognition system as recited in claim 4, wherein said second subset of said POS terminals comprises mounted tablet computers, each comprising one of said one or more cameras.

8. A facial recognition system for customer relationship management (CRM), the system comprising:
    one or more cameras disposed within a retail establishment, configured to capture one or more images of a patron within said retail establishment;
    point-of-sale (POS) terminals, operably coupled to said one or more cameras, wherein one or more of said POS terminals is configured to receive said one or more images from said one or more cameras, and is configured to receive and enter a physical payment method from said patron, and is configured to transmit over a network said one or more images and said physical payment method as entered along with a request for recognition of said patron as an authorized user of said physical payment method; and
    a backend server, disposed other than where said POS terminals are disposed, operably coupled to said POS terminals via said network, configured to receive said one or more images, said physical payment method as entered, and said request, and configured determine if said patron is recognized as said authorized user of said physical payment method based on said one or more images, and, if a credit card authorization service initially declines a charge corresponding to said physical payment method and said patron is recognized as said authorized user, configured to notify said credit card authorization service that said patron is recognized as said authorized user, and configured to receive authorization from said credit card authorization service that enables said charge to process using said physical payment method, said backend server comprising:
        a payment processor, configured to access a stored payment method corresponding to said patron, based on recognition of said one or more images of said patron as said authorized user.

9. The facial recognition system as recited in claim 8, wherein loyalty program data stored within said backend server comprises an authorized user image that corresponds to said physical payment method.

10. The facial recognition system as recited in claim 9, wherein upsell opportunities are provided to said patron via one or more of said POS terminals based upon said order history, and wherein said patron pays for an order using said stored payment method.

11. The facial recognition system as recited in claim 8, wherein a first subset of said POS terminals operably connects to said network via one or more Wi-Fi access points disposed within said retail establishment.

12. The facial recognition system as recited in claim 11, wherein said first subset of said POS terminals comprises handheld tablet computers, each comprising one of said one or more cameras.

13. The facial recognition system as recited in claim 11, wherein a second subset of said POS terminals operably connects to said network via a wired connection disposed within said retail establishment.

14. The facial recognition system as recited in claim 13, wherein said second subset of said POS terminals comprises mounted tablet computers, each comprising one of said one or more cameras.

15. A facial recognition method for customer relationship management (CRM), the method comprising:

via one or more cameras disposed within a retail establishment, capturing one or more images of a patron within the retail establishment;

via one or more of a plurality of point-of-sale (POS) terminals, receiving the one or more images from the one or more cameras, and receiving and entering a physical payment method from the patron, and transmitting over a network the one or more images and the physical payment method as entered along with a request for recognition of the patron as an authorized user of the physical payment method; and via a backend server, disposed other than where the plurality of POS terminals is disposed and operably coupled to the plurality of POS terminals via said network, receiving the one or more images, the physical payment method as entered, and the request, and configured determine if the patron is recognized as the authorized user of the physical payment method based on the one or more images, and, if a credit card authorization service initially declines a charge corresponding to the physical payment method and the patron is recognized as the authorized user, configured to notify the credit card authorization service that the patron is recognized as the authorized user, and configured to receive authorization from the credit card authorization service that enables the charge to process using the physical payment method.

16. The facial recognition method as recited in claim 15, wherein loyalty program data stored within the backend server comprises an authorized user image that corresponds to the physical payment method.

17. The facial recognition method as recited in claim 16, wherein upsell opportunities are provided to the patron via one or more of the plurality of POS terminals based upon the order history.

18. The facial recognition method as recited in claim 15, wherein a first subset of the plurality of POS terminals operably connects to the network via one or more Wi-Fi access points disposed within the retail establishment.

19. The facial recognition method as recited in claim 18, wherein the first subset of the POS terminals comprises handheld tablet computers, each comprising one of the one or more cameras.

20. The facial recognition method as recited in claim 18, wherein a second subset of the POS terminals operably connects to the network via a wired connection disposed within the retail establishment, and wherein the second subset of the POS terminals comprises mounted tablet computers, each comprising one of the one or more cameras.

* * * * *